United States Patent
Ge et al.

(10) Patent No.: US 12,028,797 B2
(45) Date of Patent: Jul. 2, 2024

(54) UNCREWED AERIAL VEHICLE COMMUNICATION METHOD AND COMMUNICATIONS DEVICE AND SYSTEM

(71) Applicant: HUAWEI TECHNOLOGIES CO., LTD., Guangdong (CN)

(72) Inventors: Cuili Ge, Beijing (CN); Yanmei Yang, Beijing (CN); Jiangwei Ying, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 447 days.

(21) Appl. No.: 17/358,566

(22) Filed: Jun. 25, 2021

(65) Prior Publication Data

US 2021/0321323 A1 Oct. 14, 2021

Related U.S. Application Data

(63) Continuation of application No. PCT/CN2019/127670, filed on Dec. 23, 2019.

(30) Foreign Application Priority Data

Dec. 27, 2018 (CN) .......................... 201811613482.2

(51) Int. Cl.
*H04W 48/16* (2009.01)
*B64C 39/02* (2023.01)
(Continued)

(52) U.S. Cl.
CPC ........... *H04W 48/16* (2013.01); *B64C 39/024* (2013.01); *H04B 17/318* (2015.01); *H04L 67/12* (2013.01);
(Continued)

(58) Field of Classification Search
CPC . B64C 39/024; B64U 2101/20; G06F 1/3209; G06F 1/3228; G06F 1/3278;
(Continued)

(56) References Cited

U.S. PATENT DOCUMENTS 10,952,113 B2 * 3/2021 Mahkonen ............ H04W 36/32
11,166,208 B2 * 11/2021 Takács ............ H04W 36/00837
(Continued)

FOREIGN PATENT DOCUMENTS

CN 102014451 A 4/2011
CN 103476079 A 12/2013
(Continued)

OTHER PUBLICATIONS

LG Electronics Inc., "General aspects of Conditional HO in Aerial," 3GPP TSG-RAN WG2 Meeting #101, R2-1802709, Athens, Greece, Feb. 26-Mar. 2, 2018, 3 pages.
(Continued)

*Primary Examiner* — Eric Nowlin
(74) *Attorney, Agent, or Firm* — Fish & Richardson P.C.

(57) ABSTRACT

Example uncrewed aerial vehicle communication methods and apparatus are described. One example method includes a first access network device receives indication information used to indicate access information of a next hop of the uncrewed aerial vehicle, where the access information includes at least one of information about a second access network device or information about a cell of a second access network device. The first access network device sends a first request based on the indication information, where the first request is used to request the second access network device to prepare an access resource for the uncrewed aerial vehicle. The second access network device prepares the access resource for the uncrewed aerial vehicle after receiving the first request.

20 Claims, 6 Drawing Sheets

(51) Int. Cl.
*B64U 101/20* (2023.01)
*H04B 17/318* (2015.01)
*H04L 67/12* (2022.01)
*H04W 48/18* (2009.01)
*H04W 76/30* (2018.01)

(52) U.S. Cl.
CPC .......... *H04W 48/18* (2013.01); *H04W 76/30* (2018.02); *B64U 2101/20* (2023.01)

(58) Field of Classification Search
CPC .............. G06F 1/3287; H04B 7/18506; H04B 7/18541; H04B 17/318; H04L 67/12; H04W 16/26; H04W 36/04; H04W 36/30; H04W 36/32; H04W 36/36; H04W 40/22; H04W 40/246; H04W 48/16; H04W 48/18; H04W 52/0206; H04W 52/0254; H04W 52/0258; H04W 52/028; H04W 76/30; H04W 76/34; Y02D 10/00; Y02D 30/70
See application file for complete search history.

(56) References Cited

U.S. PATENT DOCUMENTS

| | | | | |
|---|---|---|---|---|
| 2016/0300493 | A1* | 10/2016 | Ubhi | G08G 5/0082 |
| 2017/0230883 | A1* | 8/2017 | Dang | H04W 36/04 |
| 2020/0120563 | A1* | 4/2020 | Takács | G08G 5/0034 |
| 2020/0187072 | A1* | 6/2020 | Hong | B64C 39/024 |
| 2020/0236602 | A1* | 7/2020 | Mahkonen | H04B 7/18504 |
| 2021/0295711 | A1* | 9/2021 | Hong | G08G 5/0034 |
| 2021/0343164 | A1* | 11/2021 | Xu | G05D 1/0022 |
| 2021/0345117 | A1* | 11/2021 | Zhang | H04W 12/63 |
| 2022/0051570 | A1* | 2/2022 | Zhang | H04W 4/027 |
| 2022/0225471 | A1* | 7/2022 | Zhang | G08G 5/0026 |
| 2022/0348325 | A1* | 11/2022 | Peng | G08G 5/0069 |

FOREIGN PATENT DOCUMENTS

| | | | | |
|---|---|---|---|---|
| CN | 105228200 | A | 1/2016 | |
| CN | 108064465 | A | 5/2018 | |
| CN | 108521880 | A | 9/2018 | |
| CN | 108781379 | A | 11/2018 | |
| EP | 3038409 | A1 * | 6/2016 | ............ H04W 36/08 |
| EP | 3038409 | B1 * | 11/2017 | ............ H04W 36/08 |
| EP | 3619832 | B1 * | 4/2021 | ............ G08G 5/0013 |
| EP | 3901726 | A1 * | 10/2021 | ............ B64C 39/024 |
| EP | 3902304 | A1 * | 10/2021 | ......... H04B 7/18506 |
| EP | 3952377 | A1 * | 2/2022 | ............ B64C 39/024 |
| IN | 108886668 | A | 11/2018 | |
| WO | 2018203120 | A1 | 11/2018 | |
| WO | WO-2018203120 | A1 * | 11/2018 | ............ G08G 5/0013 |
| WO | WO-2019050500 | A1 * | 3/2019 | ............ B64C 39/024 |
| WO | WO-2023186613 | A1 * | 10/2023 | ............ G08C 17/02 |

OTHER PUBLICATIONS

Office Action in Chinese Application No. 201811613482.2, dated May 31, 2021, 32 pages.
PCT International Search Report and Written Opinion in International Application No. PCT/CN2019/127670, dated Mar. 12, 2020, 17 pages.
Extended European Search Report issued in European Application No. 19906301.7 on Jan. 7, 2022, 8 pages.

* cited by examiner

UNCREWED AERIAL VEHICLE COMMUNICATION METHOD AND COMMUNICATIONS DEVICE AND SYSTEM

CROSS-REFERENCE TO RELATED APPLICATIONS

This application is a continuation of International Application No. PCT/CN2019/127670, filed on Dec. 23, 2019, which claims priority to Chinese Patent Application No. 201811613482.2, filed on Dec. 27, 2018. The disclosures of the aforementioned applications are hereby incorporated by reference in their entirety.

TECHNICAL FIELD

Embodiments of this application relate to the communications field, and in particular, to an uncrewed aerial vehicle communication method, a communications device, and a communications system.

BACKGROUND

In recent years, an uncrewed aerial vehicle market has been booming, and uncrewed aerial vehicles have been widely used in various fields. For example, an uncrewed aerial vehicle can be used not only in a military field, but also in civil fields such as agricultural plant protection, electric power inspection, police law enforcement, and geological exploration. The uncrewed aerial vehicle may be referred to as an "unmanned aerial vehicle" (UAV), and is an unmanned aircraft operated by using a radio remote control device and a self-owned program control apparatus. The value of the uncrewed aerial vehicle lies in that an aerial platform is provided, on which the uncrewed aerial vehicle is used with other components for application extension, to replace labor work in aerial operations.

When moving in the air, the uncrewed aerial vehicle is characterized by a fast moving speed and frequent handover between cells. Due to factors such as poor air coverage performance of a base station, when the uncrewed aerial vehicle is handed over to a cell of the base station, a handover failure rate and/or a call drop rate of the uncrewed aerial vehicle are/is relatively high. This severely affects service continuity of the uncrewed aerial vehicle, and service performance of the uncrewed aerial vehicle cannot be ensured. It can be learned that, to ensure the service performance of the uncrewed aerial vehicle, a primary problem to be resolved is to improve a cell handover success rate of the uncrewed aerial vehicle.

SUMMARY

Embodiments of this application provide an uncrewed aerial vehicle communication method, a communications device, and a communications system, to resolve an existing problem of a relatively high failure rate and/or a relatively high call drop rate during cell handover performed by an uncrewed aerial vehicle.

To achieve the foregoing objective, the following technical solutions are applied to the embodiments of this application.

According to a first aspect of the embodiments of this application, an uncrewed aerial vehicle communication method is provided. The method may include: A first access network device that currently provides an access service for an uncrewed aerial vehicle receives indication information from a first access and mobility management network element, where the indication information is used to indicate access information of a next hop of the uncrewed aerial vehicle. For example, the indication information may include information about a second access network device and/or information about a cell of a second access network device. The first access network device sends, based on the indication information, a first request used to request the second access network device to prepare an access resource for the uncrewed aerial vehicle.

Based on the method according to the first aspect, the access and mobility management network element may send the access information of the next hop of the uncrewed aerial vehicle to the first access network device that currently provides the service for the uncrewed aerial vehicle, so that the first access network device sends, based on the access information of the next hop of the uncrewed aerial vehicle, the request to the second access network device that provides an access service for the next hop of the uncrewed aerial vehicle, to request the second access network device to prepare the access resource for the uncrewed aerial vehicle. In this way, before the uncrewed aerial vehicle is handed over to a cell corresponding to the next hop, an access network device corresponding to the cell may be notified in advance to prepare an access resource for the uncrewed aerial vehicle, so that a handover delay caused by preparing an access resource for the uncrewed aerial vehicle only when the uncrewed aerial vehicle is handed over to a new cell is avoided, and a success rate and efficiency of cell handover of the uncrewed aerial vehicle are improved.

In a possible design, with reference to the first aspect, the method further includes: The first access network device receives a response that is to the first request and that is used to indicate that the uncrewed aerial vehicle is allowed to access the cell of the second access network device, where the response to the first request includes the information about the cell of the second access network device. The first access network device sends the information about the cell of the second access network device to the uncrewed aerial vehicle.

Based on the possible design, information about a cell of an access network device that provides an access service for the next hop of the uncrewed aerial vehicle may be notified to the uncrewed aerial vehicle, so that the uncrewed aerial vehicle selects a cell based on the received information and accesses the cell.

In a possible design, with reference to the first aspect or the possible design of the first aspect, devices that provide an access service for the next hop of the uncrewed aerial vehicle further include a third access network device, and the method further includes: The first access network device sends, to the third access network device, a second request used to request the third access network device to prepare an access resource for the uncrewed aerial vehicle, and receives a response from the third access network device that is to the second request and that is used to indicate that the uncrewed aerial vehicle is allowed to access a cell of the third access network device, where the response to the second request includes information about the cell of the third access network device. The first access network device sends the information about the cell of the third access network device to the uncrewed aerial vehicle.

Based on the possible design, a plurality of access network devices that provide an access service for the next hop of the uncrewed aerial vehicle may be determined, and information about cells of the plurality of access network devices is sent to the uncrewed aerial vehicle, so that the uncrewed aerial vehicle selects a suitable cell from the cells of the plurality of access network devices, and accesses the selected cell.

In a possible design, with reference to the first aspect or any possible design of the first aspect, the method further includes: If the uncrewed aerial vehicle accesses the cell of the second access network device, the first access network device sends, to the third access network device, a first cancellation indication used to indicate cancellation of access of the uncrewed aerial vehicle to the cell of the third access network device. Alternatively, if the uncrewed aerial vehicle accesses the cell of the third access network device, the first access network device sends, to the second access network device, a second cancellation indication used to indicate cancellation of access of the uncrewed aerial vehicle to the cell of the second access network device.

Based on this possible design, when there are a plurality of access network devices that provide an access service for the next hop of the uncrewed aerial vehicle, when the uncrewed aerial vehicle is determined to access a cell of an access network device, an indication for cancellation of access of the uncrewed aerial vehicle to the cell may be sent to another access network device, so that when another access network device determines that no uncrewed aerial vehicle accesses a cell of the another access network device, the another access network device releases an access resource allocated to the uncrewed aerial vehicle.

In a possible design, with reference to the first aspect or any possible design of the first aspect, that the first access network device sends a first request includes: The first access network device sends the first request to the second access network device by using a communications link between the first access network device and the second access network device. Alternatively, when no communications link is established between the first access network device and the second access network device, the first access network device sends the first request to the first access and mobility management network element.

Based on the possible design, the first access network device may send the first request to the second access network device by using the link between the first access network device and the second access network device, or send the first request by using an access and mobility management network element. A sending manner is flexible.

According to a second aspect, this application provides a communications device. The communications device may be a first access network device or a chip or a system-on-a-chip in a first access network device. The communications device may implement functions performed by the first access network device in the foregoing aspect or the possible designs, and the functions may be implemented by hardware, or may be implemented by hardware executing corresponding software. The hardware or the software includes one or more modules corresponding to the foregoing functions. For example, the communications device may include a receiving unit and a sending unit.

The receiving unit is configured to receive indication information from a first access and mobility management network element, where the communications device is a device that currently provides an access service for an uncrewed aerial vehicle, the indication information is used to indicate access information of a next hop of the uncrewed aerial vehicle, the access information includes information about a second access network device and/or information about a cell of a second access network device, and the second access network device is configured to provide an access service for the next hop of the uncrewed aerial vehicle.

The sending unit is configured to send a first request based on the indication information, where the first request is used to request the second access network device to prepare an access resource for the uncrewed aerial vehicle.

For a specific implementation of the communications device, refer to behavior functions of the first access network device in the uncrewed aerial vehicle communication method provided in any one of the first aspect or the possible designs of the first aspect. Details are not described herein again. Therefore, the provided communications device can achieve same beneficial effects as any one of the first aspect or the possible designs of the first aspect.

According to a third aspect, a communications device is provided. The communications device includes a processor and a memory. The memory is configured to store computer-executable instructions. When the communications device runs, the processor executes the computer-executable instructions stored in the memory, so that the communications device performs the uncrewed aerial vehicle communication method according to any one of the first aspect or the possible designs of the first aspect.

According to a fourth aspect, a computer-readable storage medium is provided. The computer-readable storage medium stores instructions. When the instructions are run on a computer, the computer is enabled to be capable of performing the uncrewed aerial vehicle communication method according to any one of the first aspect or the possible designs of the foregoing aspect.

According to a fifth aspect, a computer program product including instructions is provided. When the computer program product runs on a computer, the computer is enabled to perform the communication method according to the first aspect or the possible designs of the foregoing aspect.

According to a sixth aspect, a chip system is provided, where the chip system includes a processor and a communications interface, and is used to support a communications device in implementing the functions in the foregoing aspects. For example, the processor receives, by using the communications interface, indication information that is from a first access and mobility management network element and that is used to indicate access information of a next hop of an uncrewed aerial vehicle, and sends a first request based on the indication information, where the first request is used to request a second access network device to prepare an access resource for the uncrewed aerial vehicle. In a possible design, the chip system further includes a memory. The memory is configured to store program instructions and data that are necessary for the communications device. The chip system may include a chip, or may include a chip and another discrete component.

For technical effects achieved by any one of the designs of the third aspect to the sixth aspect, refer to the technical effects achieved by any one of the first aspect or the possible designs of the first aspect. Details are not described again.

According to a seventh aspect of the embodiments of this application, an uncrewed aerial vehicle communication method is provided. The method may include: A second access network device that provides an access service for a next hop of an uncrewed aerial vehicle receives a first request, where the first request is used to request the second access network device to prepare an access resource for the uncrewed aerial vehicle. The second access network device prepares, based on the first request, the access resource for the uncrewed aerial vehicle.

Based on the method according to the seventh aspect, the second access network device that provides the access service for the next hop of the uncrewed aerial vehicle may receive the first request, and prepare the access resource for the uncrewed aerial vehicle in advance based on the first request. In this way, before the uncrewed aerial vehicle is handed over to a cell corresponding to the next hop, an access network device corresponding to the cell may be notified in advance to prepare an access resource for the uncrewed aerial vehicle, so that a handover delay caused by preparing an access resource for the uncrewed aerial vehicle only when the uncrewed aerial vehicle is handed over to a new cell is avoided, and a success rate and efficiency of cell handover of the uncrewed aerial vehicle are improved.

In a possible design, with reference to the seventh aspect, the method further includes: The second access network device sends a response that is to the first request and that is used to indicate that the uncrewed aerial vehicle is allowed to access a cell of the second access network device, where the response to the first request includes information about the cell of the second access network device.

Based on this possible design, the second access network device may send the information about the cell of the second access network device to a first access network device when the uncrewed aerial vehicle is allowed to access the cell of the second access network device, so that the first access network device sends the information about the cell of the second access network device to the uncrewed aerial vehicle, and the uncrewed aerial vehicle selects the cell of the second access network device, and accesses the selected cell.

In a possible design, with reference to the seventh aspect or the possible design of the seventh aspect, that the first access network device prepares the access resource for the uncrewed aerial vehicle includes: The first access network device enables an air coverage enhancement function.

Based on the possible design, an air coverage capability of an access network device can be enhanced, so that the access network device provides a highly reliable access service for the uncrewed aerial vehicle.

In a possible design, with reference to the seventh aspect or any possible design of the seventh aspect, the first request further includes an estimated time point for the uncrewed aerial vehicle to arrive at a coverage area of the second access network device; and that the second access network device enables an air coverage enhancement function includes: The second access network device enables the air interface coverage enhancement function when the estimated time point is reached.

Based on the possible design, an air coverage enhancement capability of the second access network device may be enabled only when the uncrewed aerial vehicle arrives at the coverage area of the second access network device or is about to arrive at the coverage area of the second access network device, to avoid a problem of premature power consumption of the access network device caused when the air coverage enhancement capability is enabled in advance.

In a possible design, with reference to any one of the seventh aspect or the possible designs of the seventh aspect, the method further includes: starting a timer when the last uncrewed aerial vehicle accessing the cell of the second access network device leaves the cell of the second access network device; and if no uncrewed aerial vehicle accesses the cell of the second access network device before the timer expires, the second access network device disables the air coverage enhancement function.

Based on the possible design, when no uncrewed aerial vehicle accesses the cell of the second access network device in a period of time, the air coverage enhancement function of the second access network device may be disabled, to reduce power consumption of the second access network device.

In a possible design, with reference to the seventh aspect or any possible design of the seventh aspect, that a second access network device receives a first request includes: The second access network device receives, by using a communications link between the first access network device and the second access network device, the first request sent by the first access network device; or when no communications link is established between the first access network device and the second access network device, the second access network device receives the first request from a second access and mobility management network element, where the second access and mobility management network element is configured to provide a service for the second access network device.

Based on the possible design, the second access network device may receive, by using the link between the second access network device and the first access network device, the first request sent by the first access network device, or receive the first request sent by the first access network by using an access and mobility management network element. A sending manner is simple and flexible.

According to an eighth aspect, this application provides a communications device. The communications device may be a second access network device, or a chip or a system-on-a-chip in a second access network device. The communications device may implement functions performed by the second access network device in any one of the seventh aspect or the possible designs of the seventh aspect, and the functions may be implemented by hardware or by hardware by executing corresponding software. The hardware or the software includes one or more modules corresponding to the foregoing functions. For example, the communications device may include a receiving unit and a preparation unit.

The receiving unit is configured to receive a first request, where the communications device is configured to provide an access service for a next hop of an uncrewed aerial vehicle, and the first request is used to request the communications device to prepare an access resource for the uncrewed aerial vehicle.

The preparation unit is configured to prepare the access resource for the uncrewed aerial vehicle based on the first request.

For a specific implementation of the communications device, refer to behavior functions of the second access network device in the uncrewed aerial vehicle communication method provided in any one of the seventh aspect or the possible designs of the seventh aspect, Details are not described herein again. Therefore, the provided communications device can achieve same beneficial effects as any one of the seventh aspect or the possible designs of the seventh aspect.

According to a ninth aspect, a communications device is provided, and includes a processor and a memory. The memory is configured to store computer-executable instructions. When the communications device runs, the processor executes the computer-executable instructions stored in the memory, so that the communications device performs the uncrewed aerial vehicle communication method according to any one of the seventh aspect or the possible designs of the seventh aspect.

According to a tenth aspect, a computer-readable storage medium is provided. The computer-readable storage medium stores instructions. When the instructions are run on a computer, the computer is enabled to be capable of performing the uncrewed aerial vehicle communication method according to any one of the seventh aspect or the possible designs of the foregoing aspect.

According to an eleventh aspect, a computer program product including instructions is provided. When the computer program product runs on a computer, the computer is enabled to be capable of performing the uncrewed aerial vehicle communication method according to any one of the seventh aspect or the possible designs of the foregoing aspect.

According to a twelfth aspect, a chip system is provided, where the chip system includes a processor and a communications interface, and is used to support a communications device in implementing functions in the foregoing aspects. For example, the processor receives, by using the communications interface, a first request used to request to prepare an access resource for an uncrewed aerial vehicle, and prepares, based on the first request, the access resource for the uncrewed aerial vehicle. In a possible design, the chip system further includes a memory. The memory is configured to store program instructions and data that are necessary for the communications device. The chip system may include a chip, or may include a chip and another discrete component.

For technical effects achieved by any one of the designs of the ninth aspect to the twelfth aspect, refer to the technical effects achieved by any one of the seventh aspect or the possible designs of the seventh aspect. Details are not described again.

According to a thirteenth aspect, an embodiment of this application provides an uncrewed aerial vehicle communication method, where the method may include: A first access and mobility management network element obtains access information of a next hop of an uncrewed aerial vehicle, where the access information includes information about a second access network device and/or information about a cell of a second access network device, and the second access network device is configured to provide an access service for the next hop of the uncrewed aerial vehicle. The first access and mobility management network element sends indication information to a first access network device, where the first access network device is a device that currently provides an access service for the uncrewed aerial vehicle, and the indication information is used to indicate the access information of the next hop of the uncrewed aerial vehicle.

Based on the method in the thirteenth aspect, an access and mobility management network element may obtain the access information of the next hop of the uncrewed aerial vehicle, and send the obtained information to an access network device that currently provides an access service for the uncrewed aerial vehicle, so that the access network device sends the received information to an access network device that provides an access service for the next hop of the uncrewed aerial vehicle.

In a possible design, with reference to the thirteenth aspect, that a first access and mobility management network element obtains access information of a next hop of an uncrewed aerial vehicle includes: The first access and mobility management network element obtains a driving route of the uncrewed aerial vehicle from an uncrewed aerial system server, and determines, based on the driving route of the uncrewed aerial vehicle and information about the first access network device, the access information of the next hop of the uncrewed aerial vehicle.

Based on this possible design, an access and mobility management network element may determine the access information of the next hop of the uncrewed aerial vehicle based on the driving route of the uncrewed aerial vehicle and information about an access network device that the uncrewed aerial vehicle currently accesses.

In a possible design, with reference to the thirteenth aspect or the possible design of the thirteenth aspect, that a first access and mobility management network element obtains access information of a next hop of an uncrewed aerial vehicle includes: The first access and mobility management network element obtains the access information of the next hop of the uncrewed aerial vehicle from an NWDAF.

Based on this possible design, the NWDAF may determine the access information of the next hop of the uncrewed aerial vehicle, and an access and mobility management network element may obtain the access information of the next hop of the uncrewed aerial vehicle from the NWDAF.

In a possible design, with reference to any one of the thirteenth aspect or the possible designs of the thirteenth aspect, the indication information and a registration response or a path switch response are carried in a same message.

Based on the possible design, the indication information may be sent to the first access network device by using an existing registration procedure or path request procedure, to reduce signaling overheads.

In a possible design, with reference to any one of the thirteenth aspect or the possible designs of the thirteenth aspect, when no communications link is established between the first access network device and the second access network device, the method further includes: The first access and mobility management network element receives a first request that is from the first access network device and that is used to request the second access network device to prepare an access resource for the uncrewed aerial vehicle, and sends the first request to a second access and mobility management network element.

Based on the possible design, the first request may be sent to the first access network device by using the first access and mobility management network element and the second access and mobility management network element.

In a possible design, with reference to any one of the thirteenth aspect or the possible designs of the thirteenth aspect, the method further includes: The first access and mobility management network element receives a response, to the first request, that is from the second access and mobility management network element and that is used to indicate that the uncrewed aerial vehicle is allowed to access the cell of the second access network device, where the response to the first request includes the information about the cell of the second access network device.

Based on the possible design, the first access and mobility management network element and the second access and mobility management network element may send the response to the first request to the first access network device, so that the first access network device sends information about a cell in the response to the first request to the uncrewed aerial vehicle.

According to a fourteenth aspect, this application provides a communications device. The communications device may be a first access and mobility management network element, or a chip or a system-on-a-chip in a first access and mobility management network element. The communications device may implement a function performed by the first access and mobility management network element in the fourteenth aspect or possible designs of the fourteenth aspect. The function may be implemented by hardware or by hardware executing corresponding software. The hardware or the software includes one or more modules corresponding to the foregoing functions. For example, the communications device may include an obtaining unit and a sending unit.

The obtaining unit is configured to obtain access information of a next hop of an uncrewed aerial vehicle, where the access information includes information about a second access network device and/or information about a cell of a second access network device, and the second access network device is configured to provide an access service for the next hop of the uncrewed aerial vehicle.

The sending unit is configured to send indication information to a first access network device, where the first access network device is a device that currently provides an access service for the uncrewed aerial vehicle, and the indication information is used to indicate the access information of the next hop of the uncrewed aerial vehicle.

For a specific implementation of the communications device, refer to behavior functions of the first access and mobility management network element in the uncrewed aerial vehicle communication method provided in any one of the fourteenth aspect or the possible designs of the fourteenth aspect. Details are not described herein again. Therefore, the provided communications device can achieve same beneficial effects as any one of the fourteenth aspect or the possible designs of the fourteenth aspect.

According to a fifteenth aspect, a communications device is provided, and includes a processor and a memory. The memory is configured to store computer-executable instructions. When the communications device runs, the processor executes the computer-executable instructions stored in the memory, so that the communications device performs the uncrewed aerial vehicle communication method according to any one of the fourteenth aspect or the possible designs of the fourteenth aspect.

According to a sixteenth aspect, a computer-readable storage medium is provided. The computer-readable storage medium stores instructions. When the instructions are run on a computer, the computer is enabled to be capable of performing the uncrewed aerial vehicle communication method according, to any one of the fourteenth aspect or the possible designs of the foregoing aspect.

According to a seventeenth aspect, a computer program product including instructions is provided. When the computer program product runs on a computer, the computer is enabled to be capable of performing the uncrewed aerial vehicle communication method according to any one of the fourteenth aspect or the possible designs of the foregoing aspect.

According to an eighteenth aspect, a chip system is provided. The chip system includes a processor and a communications interface, and is used by a communications device to implement functions in the foregoing aspects. For example, the processor obtains access information of a next hop of an uncrewed aerial vehicle, and sends indication information to a first access network device by using a communications interface, where the first access network device is a device that currently provides an access service for the uncrewed aerial vehicle, and the indication information is used to indicate the access information of the next hop of the uncrewed aerial vehicle. In a possible design, the chip system further includes a memory. The memory is configured to store program instructions and data that are necessary for the communications device. The chip system may include a chip, or may include a chip and another discrete component.

For technical effects achieved by any one of the designs of the fifteenth aspect to the eighteenth aspect, refer to the technical effects achieved by any one of the fourteenth aspect or the possible designs of the fourteenth aspect. Details are not described again.

According to a nineteenth aspect, an uncrewed aerial vehicle communication method is provided. The method includes: An uncrewed aerial vehicle receives information about a cell of a second access network device and information about a cell of a third access network device from a first access network device, selects, based on the information about the cell of the second access network device and the information about the cell of the third access network device, a first cell from the cell of the second access network device and the cell of the third access network device, and sends a first access request to an access network device corresponding to the first cell, where the first access request is used to request to access the first cell.

Based on the method in the nineteenth aspect, the uncrewed aerial vehicle may receive, from the first access network device in advance, information about a cell of an access network device that provides an access service for a next hop of the uncrewed aerial vehicle, select a proper cell based on the received information, send an access request to an access network device corresponding to the cell, and request to access the cell.

In a possible design, with reference to the nineteenth aspect, that an uncrewed aerial vehicle selects a first cell from the cell of the second access network device and the cell of the third access network device includes: The uncrewed aerial vehicle obtains signal quality values of the cell of the second access network device and the cell of the third access network device, and determines, as the first cell, a cell with a largest signal quality value in the cell of the second access network device and the cell of the third access network device.

Based on the possible design, the uncrewed aerial vehicle may select a suitable cell based on signal quality values of cells, and access the selected cell.

In a possible design, with reference to the nineteenth aspect or the possible design of the nineteenth aspect, the method further includes: if the uncrewed aerial vehicle fails to access the first cell, selecting a second cell with a second largest signal quality value, and sending a second access request to an access network device corresponding to the second cell, where the second access request is used to request to access the second cell.

Based on the possible design, when the uncrewed aerial vehicle fails to access the cell with the largest signal quality value, a cell with a second largest signal quality value may be selected based on signal quality values of cells, and the uncrewed aerial vehicle accesses the cell with the second largest signal quality value.

In a possible design, with reference to the nineteenth aspect or the possible designs of the nineteenth aspect, the access information further includes a priority of the cell of the second access network device and a priority of the cell of the third access network device, and that an uncrewed aerial vehicle selects a first cell from the cell of the second access network device and the cell of the third access network device includes: The uncrewed aerial vehicle determines a cell with a highest priority in the cell of the second access network device and the cell of the third access network device as the first cell.

Based on the possible design, the uncrewed aerial vehicle may select a suitable cell based on priorities of cells, and access the selected cell.

In a possible design, with reference to the nineteenth aspect or the possible designs of the nineteenth aspect, the method further includes:

if the uncrewed aerial vehicle fails to access the first cell, selecting a second cell with a second highest priority, and sending a second access request to an access network device corresponding to the second cell, where the second access request is used to request to access the second cell.

Based on the possible design, when the uncrewed aerial vehicle fails to access a cell with a high priority, the cell with the second highest priority may be selected based on priorities of cells, and the uncrewed aerial vehicle accesses the cell with the second highest priority.

According to a twentieth aspect, this application provides a communications device. The communications device may be an uncrewed aerial vehicle or a chip or a system-on-a-chip in an uncrewed aerial vehicle. The communications device may implement functions performed by the uncrewed aerial vehicle in the nineteenth aspect or the possible designs of the nineteenth aspect, and the functions may be implemented by hardware or by hardware by executing corresponding software. The hardware or the software includes one or more modules corresponding to the foregoing functions. For example, the communications device may include a receiving unit, a selection unit, and a sending unit.

The receiving unit is configured to receive access information from a first access network device, where the access information includes information about a cell of a second access network device and information about a cell of a third access network device, and the second access network device and the third access network device are configured to provide an access service for a next hop of the uncrewed aerial vehicle.

The selection unit is configured to select a first cell from the cell of the second access network device and the cell of the third access network device based on the information about the cell of the second access network device and the information about the cell of the third access network device.

The sending unit is configured to send a first access request to an access network device corresponding to the first cell, where the first access request is used to request to access the first cell.

For a specific implementation of the communications device, refer to behavior functions of the uncrewed aerial vehicle in the uncrewed aerial vehicle communication method provided in any one of the nineteenth aspect or the possible designs of the nineteenth aspect. Details are not described herein again. Therefore, the provided communications device can achieve same beneficial effects as any one of the nineteenth aspect or the possible designs of the nineteenth aspect.

According to a twenty-first aspect, a communications device is provided, and includes a processor and a memory. The memory is configured to store computer-executable instructions. When the communications device rims, the processor executes the computer-executable instructions stored in the memory, so that the communications device performs the uncrewed aerial vehicle communication method according to any one of the nineteenth aspect or the possible designs of the nineteenth aspect.

According to a twenty-second aspect, a computer-readable storage medium is provided. The computer-readable storage medium stores instructions. When the instructions are run on a computer, the computer is enabled to be capable of performing the uncrewed aerial vehicle communication method according to any one of the nineteenth aspect or the possible designs of the foregoing aspect.

According to a twenty-third aspect, a computer program product including instructions is provided. When the computer program product runs on a computer, the computer is enabled to be capable of performing the uncrewed aerial vehicle communication method according to any one of the nineteenth aspect or the possible designs of the foregoing aspect.

According to a twenty-fourth aspect, a chip system is provided. The chip system includes a processor and a communications interface, and is configured to support a communications device in implementing functions in the foregoing aspects. For example, the processor receives information about a cell of a second access network device and information about a cell of a third access network device from a first access network device by using the communications interface, selects a first cell from the cell of the second access network device and the cell of the third access network device based on the information about the cell of the second access network device and the information about the cell of the third access network device, and sends, by using the communications interface, a first access request to an access network device corresponding to the first cell. In a possible design, the chip system further includes a memory. The memory is configured to store program instructions and data that are necessary for the communications device. The chip system may include a chip, or may include a chip and another discrete component.

For technical effects achieved by any one of the designs of the twenty-first aspect to the twenty-fourth aspect, refer to the technical effects achieved by any one of the nineteenth aspect or the possible designs of the nineteenth aspect, Details are not described again.

According to a twenty-fifth aspect, an uncrewed aerial vehicle communications system is provided, and includes the first access network device according to any one of the second aspect to the sixth aspect, the second access network device according to any one of the eighth aspect to the twelfth aspect, the first access and mobility management network element according to any one of the fourteenth aspect to the eighteenth aspect, and the uncrewed aerial vehicle according to any one of the twentieth aspect to the twenty-fourth aspect.

DESCRIPTION OF EMBODIMENTS

The following describes implementations of embodiments of this application in detail with reference to the accompanying drawings.

The method provided in the embodiments of this application may be applied to any communications system that provides an access service and a network resource for an uncrewed aerial vehicle. The communications system may be a 3rd generation partnership project (3GPP) communications system, for example, may be a 4th generation (4G) communications system, may be a long term evolution (LTE) communications system, may be a 5th generation (5G) mobile communications system or a new radio (NR) system, or may be a V2X system or the like. This is not limited. The following uses the communications system shown in FIG. 1 as an example to describe the method provided in this embodiment of this application.

Figure 1:
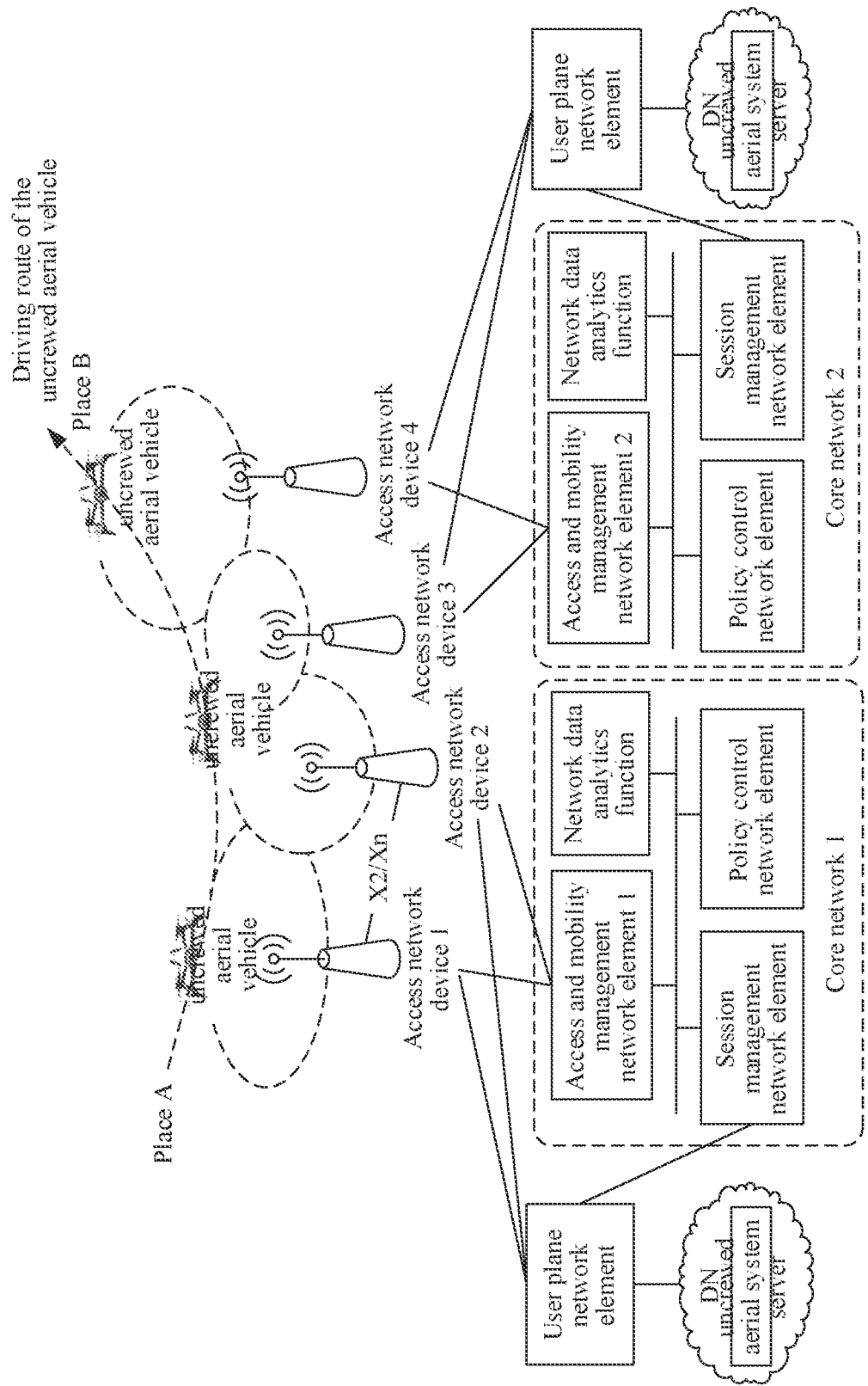
FIG. 1 is a simplified schematic diagram of a system architecture according to an embodiment of this application.

As shown in FIG. 1, the communications system may include an uncrewed aerial vehicle and a plurality of access network devices (an access network device 1, an access network device 2, an access network device 3, and an access network device 4 shown in FIG. 1), and may further include a core network, a user plane network element, and a data network (DN). Different access network devices may be connected to different core networks, or may be connected to a same core network. Access network devices in a same core network may communicate with each other by using a communications link. For example, in FIG. 1, a communications link may be established between an access network device 1 and an access network device in a core network 1, and the access network devices may communicate with each other by using the communications link. For example, when the communications system shown in FIG. 1 is a 4G communications system, the communications link may be an X2 interface link. When the communications system shown in FIG. 1 is a 5G communications system, the communications link may be an Xn interface link. The core network may include network elements such as an access and mobility management network element and a network data analysis function, and the network elements in the core network may communicate with each other by using a service-based interface. The DN may include an uncrewed aerial system server. The uncrewed aerial vehicle may communicate with an uncrewed aerial vehicle in an access network device by using a radio communications link, and the radio communications link may be a Uu link. The access network device may perform control signaling exchange with a network element in a core network. Under management and control of a core network element, a service provided by the uncrewed aerial system server is provided for the uncrewed aerial vehicle by using a user plane network element accessing the DN, or data or information generated by the uncrewed aerial vehicle is fed back to the uncrewed aerial system server or the like by using a user plane network element.

The uncrewed aerial vehicle in FIG. 1 may be referred to as a UAV, and may be used to replace a human to complete an air operation. In this embodiment of this application, an apparatus configured to implement a function of an uncrewed aerial vehicle may be the uncrewed aerial vehicle, or may be an apparatus that can support the uncrewed aerial vehicle in implementing the function, for example, a function module or a chip system in the uncrewed aerial vehicle. The following describes the method provided in the embodiments of this application by using an example in which the apparatus configured to implement a function of an uncrewed aerial vehicle is the uncrewed aerial vehicle.

The access network device in FIG. 1 is mainly configured to implement functions such as a radio physical control function, resource scheduling and radio resource management, radio access control, and mobility management. For example, the access network device may be an access network (AN)/a radio access network (RAN) device, may be a device including a plurality of 5G-AN/5G-RAN nodes, or may be any node of a NodeB (NB), an evolved NodeB (eNB), a next generation NodeB (gNB), a transmission reception point (TRP), a transmission point (TP), or another access node. In the embodiments of this application, an apparatus configured to implement a function of an access network device may be an access network device, or may be an apparatus that can support an access network device in implementing the function, for example, a chip system. The following describes the method provided in the embodiments of this application by using an example in which the apparatus configured to implement a function of an access network device is the access network device.

An access and mobility management network element in FIG. 1 may be an access and mobility management function (AMF) or a mobility management entity (MME). The access and mobility management network element is mainly responsible for performing access control, mobility management, attachment, detachment, and the like on terminals including the uncrewed aerial vehicle.

A network data analytics function (NWDAF) in FIG. 1 is mainly responsible for performing statistical analysis and the like on data generated by the uncrewed aerial vehicle or data generated by another network element in the communications system.

The uncrewed aerial system server in FIG. 1 may be referred to as an uncrewed aerial system service supplier (UAS service supplier, USS) or an uncrewed aerial system traffic management (UTM). The uncrewed aerial system server may be a server that provides a service for the uncrewed aerial vehicle in an application domain, and is mainly responsible for functions such as registration, flight plan approval, flight operation authorization, flight monitoring, and flight regulation of the uncrewed aerial vehicle; may be an uncrewed aerial vehicle supervision server; or may be an uncrewed aerial vehicle application service server.

In the communications system shown in FIG. 1, the uncrewed aerial vehicle may fly along a given driving route, and may pass through different cells in a flight process. As shown in FIG. 1, in a process in which the uncrewed aerial vehicle flies from place A to place B, the uncrewed aerial vehicle first passes through a cell of an access network device 1, then passes through a cell of an access network device 2 or an access network device 3, and finally passes through a cell of an access network device 3, to arrive at a destination (the place B). To ensure continuity of the uncrewed aerial vehicle service, when the uncrewed aerial vehicle flies from one cell to another cell, inter-cell handover needs to be performed for the uncrewed aerial vehicle in a timely and efficient manner. To implement timely and efficient cell handover for the uncrewed aerial vehicle, the embodiments of this application provide the following method.

The access and mobility management network element may send indication information to an access network device that currently provides a service for the uncrewed aerial vehicle, to indicate access information of a next hop of the uncrewed aerial vehicle. The access network device that currently provides a service for the uncrewed aerial vehicle may send, based on the access information of the next hop of the uncrewed aerial vehicle, a request to the access network device that provides an access service for the next hop of the uncrewed aerial vehicle, to request the access network device that provides the access service for the next hop of the uncrewed aerial vehicle to prepare an access resource for the uncrewed aerial vehicle, for example, enable an air coverage enhancement function for the uncrewed aerial vehicle. In this way, the access network device that provides the access service for the next hop of the uncrewed aerial vehicle may be notified in advance, and before the uncrewed aerial vehicle is handed over to a cell of the access network device, the access resource is prepared for the uncrewed aerial vehicle, thereby improving a success rate and efficiency of cell handover of the uncrewed aerial vehicle. Specifically, for an implementation process of the method, refer to descriptions in the following embodiments corresponding to FIG. 3 and FIG. 4A and FIG. 4B.

It should be noted that the network architecture shown in FIG. 1 is merely an example architecture, and a quantity of devices included in the communications system shown in FIG. 1 is not limited in the embodiments of this application. Although not shown, in addition to the device shown in FIG. 1, the network shown in FIG. 1 may further include another functional entity, for example, may include unified data management (UDM). In addition, in the communications system in FIG. 1, names of the devices and the communications links between the devices are merely an example. In specific implementation, the devices and the communications links between the devices may alternatively have other names. This is not specifically limited in this embodiment of this application.

Figure 2:
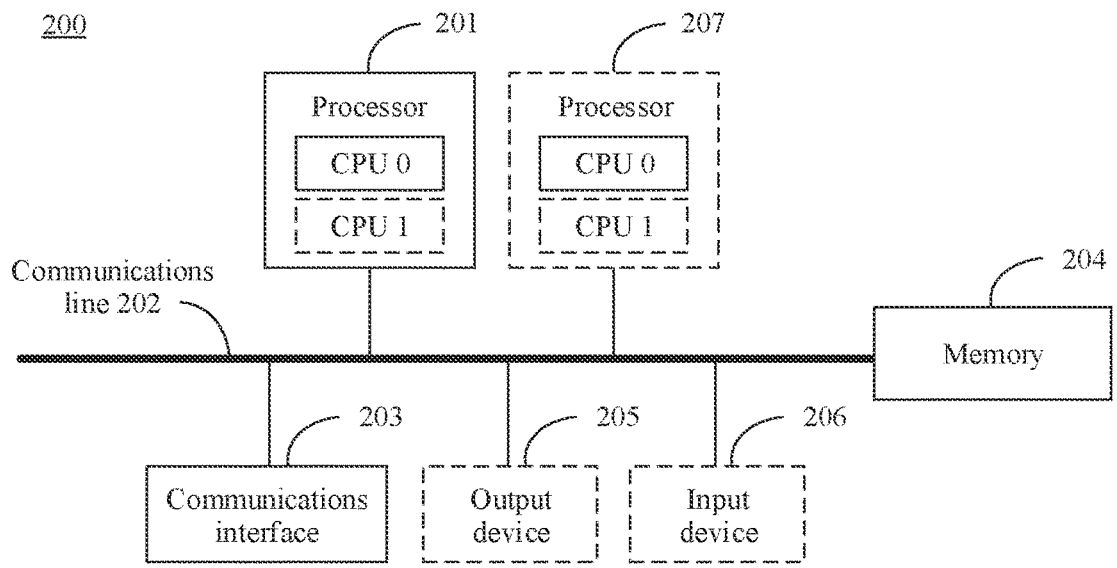
FIG. 2 is a schematic diagram of composition of a communications device according to an embodiment of this application.

The access network device, the access and mobility management network element, and the uncrewed aerial vehicle that execute the embodiments of this application may be implemented by hardware shown in FIG. 2 or a combination of hardware and computer software. FIG. 2 is a schematic diagram of composition of a communications device 200 according to an embodiment of this application. As shown in FIG. 2, the communications device 200 includes at least one processor 201, a communications line 202, and at least one communications interface 203. Further, the communications device 200 may further include a memory 204. The processor 201, the memory 204, and the communications interface 203 may be connected to each other by using the communications line 202. In this embodiment of this application, the "at least one" may be one, two, three, or more, and this is not limited.

The processor 201 may be a central processing unit (CPU), a general-purpose processor, a network processor (NP), a digital signal processor (DSP), a microprocessor, a microcontroller, a programmable logic device (PLD), or any combination thereof. The processor may alternatively be any other apparatus having a processing function, for example, a circuit, a component, or a software module.

The communications line 202 may include a path used to transmit information between components included in the communications device.

The communications interface 203 may be configured to communicate with another device or a communications network (for example, the Ethernet, a radio access network (radio access network, RAN), or a wireless local area network (WLAN)). The communications interface 203 may be a module, a circuit, a transceiver, or any apparatus that can implement communication.

The memory 204 may include the database shown in FIG. 2, and may be a read-only memory (ROM) or another type of static storage device that can store static information and/or instructions, or may be a random access memory (RAM) or another type of dynamic storage device that can store information and/or instructions, or may be an electrically erasable programmable read-only memory (EEPROM), a compact disc read-only memory (CD-ROM) or another compact disc storage, optical disc storage (including a compact disc, a laser disc, an optical disc, a digital versatile disc, a Blu-ray disc, or the like), a magnetic disk storage medium or another magnetic storage device, or any other medium that can be used to carry or store expected program code in a form of an instruction or a data structure and that is accessible by a computer. This is not limited thereto. In a possible design, the memory 204 may be independent of the processor 201. To be specific, the memory 204 may be a memory outside the processor 201. In this case, the memory 204 may be connected to the processor 201 by using the communications line 202, and is configured to store instructions or program code. When invoking and executing the instructions or the program code stored in the memory 204, the processor 201 can implement an uncrewed aerial vehicle communication method provided in the following embodiments of this application. In another possible design, the memory 204 may alternatively be integrated with the processor 201. Tb be specific, the memory 204 may be an internal memory of the processor 201. For example, the memory 204 is a cache, and may be configured to temporarily store some data, instruction information, and/or the like.

In an example, the processor 201 may include one or more CPUs, such as a CPU 0 and a CPU 1 in FIG. 2. In another possible implementation, the communications device 200 may include a plurality of processors, for example, the processor 201 and a processor 207 in FIG. 2. In still another possible implementation, the communications device 200 may further include an output device 205 and an input device 206. For example, the input device 206 may be a device such as a keyboard, a mouse, a microphone, or a joystick, and the output device 205 may be a device such as a display or a speaker.

It should be noted that when the communications device 200 implements a function of an access network device or an access and mobility management network element, the communications device 200 may be a general-purpose device or a dedicated device. For example, the communications device 200 may be a desktop computer, a portable computer, a network server, a mobile phone, a tablet computer, a wireless terminal, an embedded device, a chip system, or a device having a structure similar to that in FIG. 2. A type of the communications device 200 is not limited in this embodiment of this application. In the embodiments of this application, a chip system may include a chip, or may include a chip and another discrete component. In addition, a structure of the device shown in FIG. 2 does not constitute a limitation on the communications device. In addition to the components shown in FIG. 2, the communications device may include more or fewer components than those shown in the figure, or combine some components, or have different component arrangements.

With reference to the communications system shown in FIG. 1, the following describes art uncrewed aerial vehicle communication method provided in the embodiments of this application. Each device in the following method embodiments may have components shown in FIG. 2, and details are not described again. It should be noted that, in the following embodiments of this application, names of messages or names of parameters in messages between devices are merely examples, and the messages or the parameters may have other names in specific implementation. This is not specifically limited in the embodiments of this application.

Figure 3:
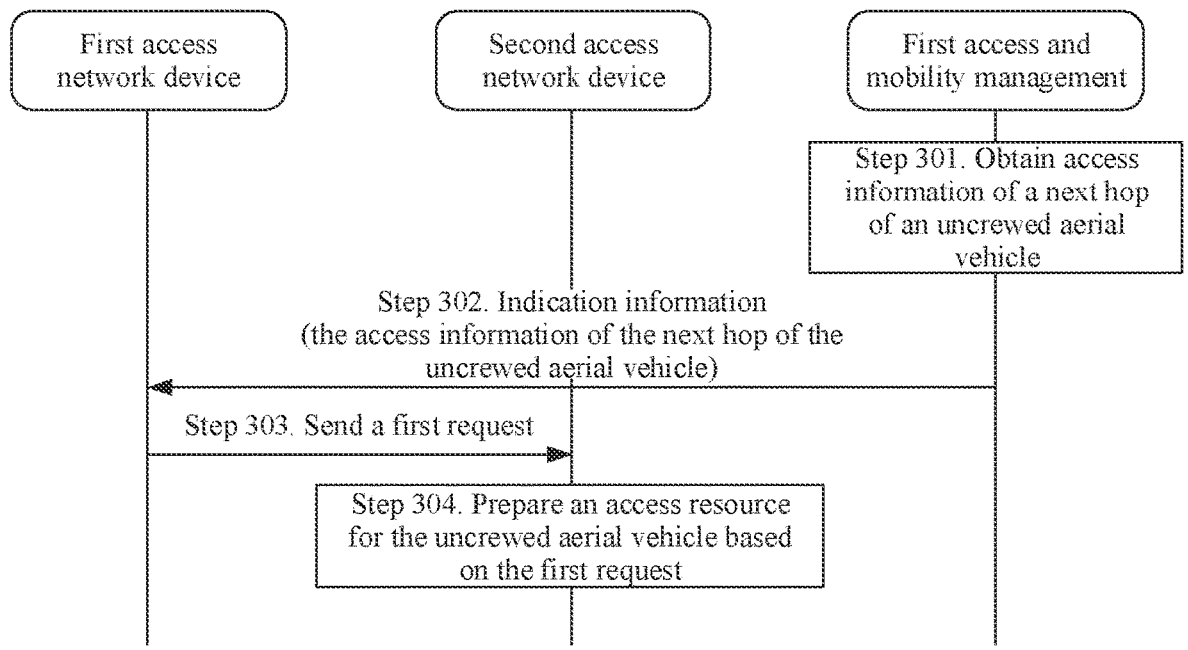
FIG. 3 is a flowchart of an uncrewed aerial vehicle communication method according to an embodiment of this application.

FIG. 3 shows an uncrewed aerial vehicle communication method according to an embodiment of this application. As shown in FIG. 3, the method may include the following steps.

Step 301. A first access and mobility management network element obtains access information of a next hop of an uncrewed aerial vehicle.

The first access and mobility management network element may be a core network element that currently provides a service for the uncrewed aerial vehicle. For example, if the uncrewed aerial vehicle is currently located in a cell of the access network device 1 in FIG. 1, the first access and mobility management network element may be an access and mobility management network element 1 in the core network 1.

The access information of the next hop of the uncrewed aerial vehicle may include information about a second access network device and/or information about a cell of a second access network device. The second access network device may be configured to provide an access service for the next hop of the uncrewed aerial vehicle. In this embodiment of this application, access network devices that provide an access service for the next hop of the uncrewed aerial vehicle may include one access network device, or may include two or more access network devices. This is not limited. For example, if the uncrewed aerial vehicle is currently located in the cell of the access network device 1 in FIG. 1, the access network device 1 provides an access service for the uncrewed aerial vehicle, and subsequently, as the uncrewed aerial vehicle flies, the uncrewed aerial vehicle may fly to a cell of the access network device 2 or a cell of the access network device 3 in the next hop. The access network device 2 or the access network device 3 provides an access service for the uncrewed aerial vehicle, and the devices that provide the access service for the next hop of the uncrewed aerial vehicle may include the access network device 2 and the access network device 3.

The information about the second access network device may be used to identify the second access network device. For example, the information about the second access network device may be an internet protocol UP) address, a media access control (MAC) address, or the like of the second access network device. This is not limited.

The information about the cell of the second access network device may include an ID of the cell of the second access network device, and may further include a cell frequency, a cell priority, a preamble, a cell handover threshold, and the like. The ID of the cell may be used to identify the cell, and may be a number or an index of the cell. The cell frequency may be a frequency on which the cell is accessed. The cell priority may be used to indicate a sequence of accessing the cell. The preamble may be a preamble used for accessing the cell. The cell handover threshold may be a threshold for handing over the uncrewed aerial vehicle from the cell to a new cell. When a signal quality value of the cell accessed by the uncrewed aerial vehicle is less than the cell handover threshold, the uncrewed aerial vehicle may be handed over to the new cell. When a signal quality value of the cell accessed by the uncrewed aerial vehicle is greater than or equal to the cell handover threshold, the uncrewed aerial vehicle does not need to be handed over to the new cell.

In an example, the first access and mobility management network element may obtain a driving route of the uncrewed aerial vehicle from an uncrewed aerial system server, and obtain the access information of the next hop of the uncrewed aerial vehicle based on the driving route of the uncrewed aerial vehicle and information about a first access network device.

The driving route of the uncrewed aerial vehicle may be set by a user based on a requirement, and is pre-stored on the uncrewed aerial system server. The driving route of the uncrewed aerial vehicle may include a plurality of geographical areas, and these geographical areas may be arranged based on a driving sequence of the uncrewed aerial vehicle. For example, the driving route of the uncrewed aerial vehicle may include {a place A, a place C, a place D, . . . , a place B}. This indicates that the driving route of the uncrewed aerial vehicle is from the place A to the place B by passing through the place C, the place D, and the like.

The first access network device may be a device that currently provides an access service for the uncrewed aerial vehicle. The information about the first access network device may be used to identify the first access network device, and the information about the first access network device may be an IP address, a MAC address, or the like of the first access network device. This is not limited.

That the first access and mobility management network element obtains the access information of the next hop of the uncrewed aerial vehicle based on the driving route of the uncrewed aerial vehicle and information about a first access network device may include: The first access and mobility management network element determines, based on the information about the first access network device, a geographical area in which the uncrewed aerial vehicle is currently located, determines a next geographical area, in the driving route of the uncrewed aerial vehicle, adjacent to the geographical area in which the uncrewed aerial vehicle is currently located, and obtains the access information of the next hop of the uncrewed aerial vehicle based on the next geographical area. For example, an access network device covering the next geographical area may be determined as the second access network device.

It should be noted that, in this embodiment of this application, the driving route of the uncrewed aerial vehicle may further be stored and updated in real time on a RAN operation and management (OAM). The RAN OAM may determine the access information of the next hop of the uncrewed aerial vehicle based on the driving route. The first access and mobility management network element may obtain the access information of the next hop of the uncrewed aerial vehicle from the RAN OAM.

For example, in still another example, the first access and mobility management network element may send, to the RAN OAM, a request message including the next geographical area of the uncrewed aerial vehicle, to request access information of the area. After receiving the request, the RAN OAM determines information about a base station and/or information about an access cell corresponding to the requested geographical area. For another example, the first access and mobility management network element may send, to the RAN OAM, a request message including information about a base station corresponding to the next hop of the uncrewed aerial vehicle, and is used to request access information of the uncrewed aerial vehicle corresponding to the base station. After receiving the request, the RAN OAM determines information about an access cell corresponding to the requested base station.

In still another example, the first access and mobility management network element may obtain the access information of the next hop of the uncrewed aerial vehicle from an NWDAF. For example, the first access and mobility management network element may send a request including an identifier of the uncrewed aerial vehicle to the NWDAF, to request the access information of the next hop of the uncrewed aerial vehicle. Optionally, the request may further include information about a current flight area of the uncrewed aerial vehicle. After receiving the request, the NWDAF obtains the access information of the next hop of the uncrewed aerial vehicle, and sends the access information of the next hop of the uncrewed aerial vehicle to the first access and mobility management network element.

That the NWDAF obtains the access information of the next hop of the uncrewed aerial vehicle may include: The NWDAF may obtain historical flight data of the uncrewed aerial vehicle, perform statistical analysis on the historical flight data of the uncrewed aerial vehicle, determine a flight characteristic of the uncrewed aerial vehicle, and obtain, based on the flight characteristic of the uncrewed aerial vehicle, the current flight area of the uncrewed aerial vehicle, and flight dynamics (such as a flight direction, a flight height, and a flight speed) of the uncrewed aerial vehicle, the access information of the next hop of the uncrewed aerial vehicle.

The historical flight data of the uncrewed aerial vehicle may include a flight time period of the uncrewed aerial vehicle, a flight area of the uncrewed aerial vehicle, and the like. The flight characteristic of the uncrewed aerial vehicle may include a flight route, a flight habit, and the like of the uncrewed aerial vehicle.

Step 302. The first access and mobility management network element sends indication information to the first access network device.

The indication information may be used to indicate the access information of the next hop of the uncrewed aerial vehicle, for example, may be an identifier corresponding to the access information of the next hop of the uncrewed aerial vehicle. For the access information of the next hop of the uncrewed aerial vehicle, refer to the foregoing descriptions. Details are not described again.

In an example, the first access and mobility management network element may send the indication information to the first access network device in a process in which network registration is performed for the uncrewed aerial vehicle. For example, the uncrewed aerial vehicle may send a registration request to the first access and mobility management network element by using the first access network device. After receiving the registration request, the first access and mobility management network element performs network registration for the uncrewed aerial vehicle, and returns a registration response and the indication information to the first access network device.

The registration request may be used to request to perform network registration for the uncrewed aerial vehicle, and the registration response may be used to indicate that network registration for the uncrewed aerial vehicle succeeds or fails. The indication information and the registration response may be carried in a same message. For example, the indication information and the registration response are carried in an N2 message and sent to the first access network device. After receiving the N2 message, the first access network device may obtain the indication information from the N2 message, and does not parse the registration response, but sends the registration response to the uncrewed aerial vehicle.

In this way, the indication information used to indicate the access information of the next hop of the uncrewed aerial vehicle may be sent to the first access network device by using an existing procedure, to reduce signaling overheads. Similarly, the first access and mobility management network element may also send the indication information to the first access network device by using another existing procedure (for example, a service request procedure). This is not limited.

In still another example, the first access and mobility management network element may further send the indication information to the first access network device on an N2 link between the first access and mobility management network element and the first access network device. For example, the first access and mobility management network element may include the indication information in an independent N2 message, and send the N2 message to the first access network device.

In still another example, the first access network device may send a path switch request to the first access and mobility management network element, to request to update a user plane path of the uncrewed aerial vehicle. After receiving the path switch request, the first access and mobility management entity performs a corresponding user plane path update procedure, and returns a path switch response and the indication information to the first access network device.

The path switch response may be used to indicate that switching of the user plane path of the uncrewed aerial vehicle succeeds or fails. The indication information and the path switch response may be carried in a same message. For example, the indication information is carried in an N2 message and sent to the first access network device. After receiving the N2 message, the first access network device may obtain the indication information from the N2 message.

It should be noted that, in this embodiment of this application, that the indication information and the registration response or the path switch response are carried in a same message and sent to the first access network device is not limited. The indication information may alternatively be carried in another message, for example, a newly added message, sent by the first access and mobility management network element to the first access network device. This is not limited.

In the embodiments of this application, the first access network device may measure a signal quality value of a cell currently accessed by the uncrewed aerial vehicle, send the first request to the first access and mobility management network element when determining that the signal quality value of the cell currently accessed by the uncrewed aerial vehicle is less than a preset handover threshold, and request the access information of the next hop of the uncrewed aerial vehicle. The first access and mobility management network element returns a response message including the access information of the next hop of the uncrewed aerial vehicle to the first access network device.

The preset handover threshold may be set based on a requirement. When the signal quality value of the cell accessed by the uncrewed aerial vehicle is less than the preset handover threshold, it indicates that the signal quality of the cell currently accessed by the uncrewed aerial vehicle is poor, and the uncrewed aerial vehicle needs to be handed over to another new cell. When the signal quality value of the cell accessed by the uncrewed aerial vehicle is greater than or equal to the preset handover threshold, the uncrewed aerial vehicle does not need to be handed over to another cell. In this embodiment of this application, the first access network device may measure, by using a conventional technology, the signal value of the cell accessed by the uncrewed aerial vehicle. Details are not described herein.

Step 303. The first access network device receives the indication information, and sends the first request based on the indication information.

The first request may be used to request the second access network device to prepare an access resource for the uncrewed aerial vehicle, for example, may be used to request the second access network device to enable an air coverage enhancement function.

For example, the first request is used to request the second access network device to enable the air coverage enhancement function. In a possible design, the first request may include an indicator, and the indicator may be used to indicate the second access network device to enable the air coverage enhancement function. For example, the indicator may be a binary bit number "0" or "1". When the indicator is "1", the second access network device is indicated to enable the air coverage enhancement function. When the indicator is "0" or the first request does not include the indicator, the second access network device is indicated not to enable the air coverage enhancement function. In still another possible design, the first request may include device type indication information, and the device type indication information is used to identify an uncrewed aerial vehicle device type. After receiving the first request, the second access network device may learn, based on the terminal type, that a terminal is an uncrewed aerial vehicle, and enable the air coverage enhancement function. The terminal type indication information may be an identifier of an uncrewed aerial vehicle, and the identifier of the uncrewed aerial vehicle may be used to identify the uncrewed aerial vehicle.

In an example, that the first access network device sends the first request based on the indication information may include: The first access network device uses the indication information as a trigger condition, and when receiving the indication information, the first access network device sends the first request to the second access network device based on the information about the second access network device and/or the information about the cell of the second access network device that are/is indicated by the indication information.

In still another example, that the first access network device sends the first request based on the indication information may include: After receiving the indication information, the first access network device may measure the signal quality value of the cell currently accessed by the uncrewed aerial vehicle. When determining that the signal quality value of the cell currently accessed by the uncrewed aerial vehicle is less than the preset handover threshold, the first access network device sends the first request to the second access network device based on the information about the second access network device and/or the information about the cell of the second access network device that are/is indicated by the indication information.

That the first access network device sends the first request to the second access network device may include any one of the following manners.

Manner 1: A communications link is established between the first access network device and the second access network device.

The first access network device sends the first request to the second access network device by using the communications link.

For example, in FIG. 1, it is assumed that the access network device 1 is a device that currently provides an access service for the uncrewed aerial vehicle, and the access network device 2 is configured to provide an access service for a next hop of the uncrewed aerial vehicle. It can be learned from FIG. 1 that the access network device 1 and the access network device 2 are served by a same core network, and the access network device 1 may send the first request to the access network device 2 by using the communications link between the access network device 1 and the access network device 2.

Manner 2: No communications link is established between the first access network device and the second access network device.

The first access network device sends the first request to the first access and mobility management network element. After receiving the first request, the first access and mobility management network element sends the first request to a second access and mobility management network element. After receiving the first request, the second access and mobility management network element sends the first request to the second access network device.

The second access and mobility management network element is configured to provide a service for the second access network device, and there is an N2 or S1-MME connection between the second access and mobility management network element and the second access network device.

For example, in FIG. 1, it is assumed that the access network device 1 is a device that currently provides an access service for the uncrewed aerial vehicle, and the access network device 3 is configured to provide an access service for a next hop of the uncrewed aerial vehicle. It can be learned from FIG. 1 that there is no communications link between the access network device 1 and the access network device 3. For example, there is no X2 interface link or Xn interface connection. The access network device 1 is served by the access and mobility management network element 1, and the access network device 3 is served by the access and mobility management network element 2. The access network device 1 may send the first request to the access and mobility management network element 1. After receiving the first request, the access and mobility management network element 1 sends the first request to the access and mobility management network element 2. After receiving the first request, the access and mobility management network element 2 sends the first request to the access network device 3.

Step 304. The second access network device receives the first request, and prepares the access resource for the uncrewed aerial vehicle based on the first request.

That the second access network device prepares the access resource for the uncrewed aerial vehicle based on the first request may include: The second access network device uses the first request as a trigger condition for the second access network device to prepare the access resource for the uncrewed aerial vehicle, and starts to prepare the access resource for the uncrewed aerial vehicle when the second access network device receives the first request.

That the second access network device prepares the access resource for the uncrewed aerial vehicle may include: enabling the air coverage enhancement function, and may further include: determining whether the uncrewed aerial vehicle is allowed to access the cell of the second access network device, and if the uncrewed aerial vehicle is allowed to access the cell of the second access network device, obtaining the information that is about the cell of the second access network device and that is provided by the second access network device for the uncrewed aerial vehicle. For a manner in which the second access network device determines whether the uncrewed aerial vehicle is allowed to access the cell of the second access network device, refer to the conventional technology. For related descriptions of the information about the cell of the second access network device, refer to descriptions in step 301, Details are not described again.

Based on the method described in FIG. 3, the access and mobility management network element may send, to the first access network device that currently provides a service for the uncrewed aerial vehicle, the indication information used to indicate the access information of the next hop of the uncrewed aerial vehicle, so that the first access network device sends, based on the access information of the next hop of the uncrewed aerial vehicle, a request to an access network device (for example, the second access network device) that provides an access service for the next hop of the uncrewed aerial vehicle, to request the access network device that provides the access service for the next hop of the uncrewed aerial vehicle to prepare the access resource for the uncrewed aerial vehicle, for example, to enable the air coverage enhancement function for the uncrewed aerial vehicle. Compared with the conventional technology, in the method shown in FIG. 3, before the uncrewed aerial vehicle is handed over to a new cell, an access network device corresponding to the cell may be notified in advance to prepare the access resource for the uncrewed aerial vehicle, that is, to prepare in advance for cell handover of the uncrewed aerial vehicle, so that a handover delay caused by preparing the access resource for the uncrewed aerial vehicle only when the uncrewed aerial vehicle is handed over to the new cell is avoided, and a success rate and efficiency of cell handover of the uncrewed aerial vehicle is improved.

In the method shown in FIG. 3, the first request may include an estimated time point for the uncrewed aerial vehicle to arrive at a coverage area of the second access network device, and the estimated time point may be determined by the first access network device based on a current traveling speed of the uncrewed aerial vehicle and the coverage area of the second access network device.

After receiving the first request, the second access network device obtains the estimated time point from the first request, and prepares the access resource, for example, enables the air coverage enhancement function, for the uncrewed aerial vehicle when the estimated time point is reached or is about to be reached.

Assuming that the first access network device estimates that a time point for the uncrewed aerial vehicle to arrive at the coverage area of the second access network device is 10 o'clock, the second access network device may prepare the access resource for the uncrewed aerial vehicle at 10 o'clock, or may prepare the access resource for the uncrewed aerial vehicle at 9:55 or another moment close to 10 o'clock.

In this way, a time point at which the uncrewed aerial vehicle arrives at the coverage area of the second access network device may be referred to, to start to prepare the access resource for the uncrewed aerial vehicle. This avoids a case in which an air resource of the second access network device is idle for a long time because the access resource is prematurely prepared for the uncrewed aerial vehicle, and a problem that power consumption of the second access network device is caused because the air coverage enhancement function is enabled for a long time.

Further, in the method in FIG. 3, after the first access network device sends the first request to the second access network device, the method may further include: The second access network device sends a response to the first request to the first access network device, and the first access network device receives the response to the first request.

For a process in which the second access network device sends the response to the first request to the first access network device, refer to a process in which the first access network device sends the first request to the second access network device. For example, a communications link is established between the first access network device and the second access network device, and the second access network device may send the response to the first request to the second access network device by using the communications link. Alternatively, no communications link is established between the first access network device and the second access network device. The second access network device sends the response to the first request to the second access and mobility management network element. After receiving the response to the first request, the second access and mobility management network element forwards the response to the first request to the first access and mobility management network element. After receiving the response to the first request, the first access and mobility management network element forwards the response to the first request to the first access network device.

When the second access network device determines that the uncrewed aerial vehicle is allowed to access the cell of the second access network device, the response to the first request may be used to indicate that the uncrewed aerial vehicle is allowed to access the cell of the second access network device, and the response to the first request may include the information about the cell of the second access network device. There may be one or more cells that are of the second access network device and that the uncrewed aerial vehicle is allowed to access. The cell may be a dedicated cell or a common cell. After the first access network device receives the response to the first request, the method may further include: The first access network device sends the information about the cell of the second access network device to the uncrewed aerial vehicle.

When the second access network device determines that the uncrewed aerial vehicle is not allowed to access the cell of the second access network device, the response to the first request may be used to indicate that the uncrewed aerial vehicle is not allowed to access the cell of the second access network device. After receiving the response to the first request, the first access network device does not send any information to the uncrewed aerial vehicle.

In this way, the first access network device may send, to the uncrewed aerial vehicle, information about cells that are of access network devices in access network devices that provide an access service for the next hop of the uncrewed aerial vehicle and that the uncrewed aerial vehicle is allowed to access, so that the uncrewed aerial vehicle selects a suitable cell from a plurality of cells based on the received information about the cells, and accesses the selected cell.

Further, to avoid power consumption of the second access network device caused when the second access network device always enables the air coverage enhancement capability, in the method shown in FIG. 3, a timer may be further set in the second access network device. Duration of the timer may be set based on a requirement. This is not limited.

The timer is started when the last uncrewed aerial vehicle that accesses the cell of the second access network device leaves the cell of the second access network device. If no uncrewed aerial vehicle accesses the cell of the second access network device before the timer expires (or overflows), the second access network device disables the air coverage enhancement function.

In this way, if no uncrewed aerial vehicle accesses the cell of the second access network device within a period of time, the air coverage enhancement function of the second access network device may be disabled, to avoid power consumption caused by enabling the air coverage enhancement function when no uncrewed aerial vehicle accesses the cell of the second access network device.

The foregoing describes only an example in which the device that provides the access service for the next hop of the uncrewed aerial vehicle is the second access network device. Optionally, in the method shown in FIG. 3, the devices that provide an access service for the next hop of the uncrewed aerial vehicle may further include a plurality of other devices such as a third access network device and a fourth access network device. Similar to a case in which the first access network device sends the first request to the second access network device, the first access network device may also send, to another device, a request used to request to prepare an access resource for the uncrewed aerial vehicle, so that the another device prepares the access resource for the uncrewed aerial vehicle. Specifically, for a process thereof, refer to steps 303 and 304.

For example, the devices that provide an access service for the next hop of the uncrewed aerial vehicle further include the third access network device. The method shown in FIG. 3 may further include: The first access network device sends a second request to the third access network device, where the second request is used to request the third access network device to prepare an access resource for the uncrewed aerial vehicle.

The third access network device prepares the access resource for the uncrewed aerial vehicle based on the second request, and sends a response to the second request to the first access network device. The first access network device receives the response that is to the second request and that is from the third access network device.

For a process in which the first access network device sends the second request to the third access network device, refer to the process in which the first access network device sends the first request to the second access network device. Details are not described again.

For a process in which the third access network device prepares the access resource for the uncrewed aerial vehicle based on the second request, and sends the response to the second request to the first access network device, refer to a process in which the second access network device prepares the access resource for the uncrewed aerial vehicle based on the first request, and sends the response to the first request to the first access network device. Details are not described again.

When the third access network device determines that the uncrewed aerial vehicle is allowed to access a cell of the third access network device, the response to the second request may be used to indicate that the uncrewed aerial vehicle is allowed to access the cell of the third access network device, and the response to the second request may include information about the cell of the third access network device. After receiving the response to the second request, the first access network device may further send the information about the cell of the third access network device to the uncrewed aerial vehicle.

When the third access network device determines that the uncrewed aerial vehicle is not allowed to access a cell of the third access network device, the response to the second request may be used to indicate that the uncrewed aerial vehicle is not allowed to access the cell of the third access network device. After receiving the response to the second request, the first access network device does not send any information to the uncrewed aerial vehicle.

It should be noted that a time sequence in which the first access network device sends the first request to the second access network device and sends the second request to the third access network device is not limited in this embodiment of this application. For example, the first access network device may first send the first request to the second access network device, and then send the second request to the third access network device. Alternatively, the first access network device may simultaneously send the first request to the second access network device and the second request to the third access network device. This is not limited.

It can be learned from the foregoing descriptions that when the devices that provide an access service for the next hop of the uncrewed aerial vehicle include two or more access network devices, the first access network device may separately send, to the two or more access network devices, a request used to request to prepare an access resource for the uncrewed aerial vehicle, receive responses returned by the two or more access network devices, and send information about cells of the two or more access network devices to the uncrewed aerial vehicle, so that the uncrewed aerial vehicle selects a suitable cell from the cells of the two or more access network devices based on the information about the cells of the two or more access network devices, and accesses the cell. For example, the devices that provide an access service for the next hop of the uncrewed aerial vehicle include the second access network device and the third access network device. The process may include the following steps.

The uncrewed aerial vehicle receives the access information from the first access network device, where the access information may include the information about the cell of the second access network device and the information about the cell of the third access network device.

The uncrewed aerial vehicle selects a first cell from the cell of the second access network device and the cell of the third access network device based on the access information, and sends a first access request to an access network device corresponding to the first cell, where the first access request is used to request to access the first cell.

In an example, that the uncrewed aerial vehicle selects a first cell from the cell of the second access network device and the cell of the third access network device may include: The uncrewed aerial vehicle obtains a signal quality value of the cell of the second access network device and a signal quality value of the cell of the third access network device, and determines a cell having a largest signal quality value as the first cell.

If the uncrewed aerial vehicle fails to access the first cell, the uncrewed aerial vehicle selects a second cell with a second largest signal quality value, and sends a second access request to an access network device corresponding to the second cell, where the second access request is used to request to access the second cell.

In still another example, the access information further includes a priority of the cell of the second access network device and a priority of the cell of the third access network device, and that the uncrewed aerial vehicle selects a first cell from the cell of the second access network device and the cell of the third access network device may include: The uncrewed aerial vehicle determines a cell with a highest priority in the cell of the second access network device and the cell of the third access network device as the first cell.

If the uncrewed aerial vehicle fails to access the first cell, the uncrewed aerial vehicle selects a second cell with a second highest priority, and sends a second access request to an access network device corresponding to the second cell, where the second access request is used to request to access the second cell.

Further, in the method shown in FIG. 3, to prevent an access network device corresponding to a cell that the uncrewed aerial vehicle does not access from enabling the air coverage enhancement capability and causing power consumption of the access network device, the method may further include the following steps.

If the uncrewed aerial vehicle accesses the cell of the second access network device, the first access network device sends a first cancellation indication to the third access network device. The first cancellation indication may be an independent message, or may be an information element or a parameter in the message. The third access network device disables the air coverage enhancement function based on the first cancellation indication, where the first cancellation indication is used to indicate cancellation of access of the uncrewed aerial vehicle to the cell of the third access network device.

Alternatively, if the uncrewed aerial vehicle accesses the cell of the third access network device, the first access network device sends a second cancellation indication to the second access network device, and the second access network device disables the air coverage enhancement function based on the second cancellation indication, where the second cancellation indication is used to indicate cancellation of access of the uncrewed aerial vehicle to the cell of the second access network device.

In this way, within a period of time, if no uncrewed aerial vehicle accesses the cell of the second access network device, the access network device is sent with a cancellation indication, to indicate the access network device that no uncrewed aerial vehicle accesses the cell. Subsequently, the access network device may disable the air coverage enhancement function of the access network device based on the cancellation indication, so that power consumption caused by enabling the air interface coverage enhancement function is reduced.

With reference to FIG. 1, for example, a first access network device is the access network device 1 in FIG. 1, devices that provide an access service for a next hop of an uncrewed aerial vehicle include a second access network device and a third access network device, the second access network device is the access network device 2 in FIG. 1, and the third access network device is the access network device 3 in FIG. 1. The method shown in FIG. 4 is described as follows.

Figure 4A:
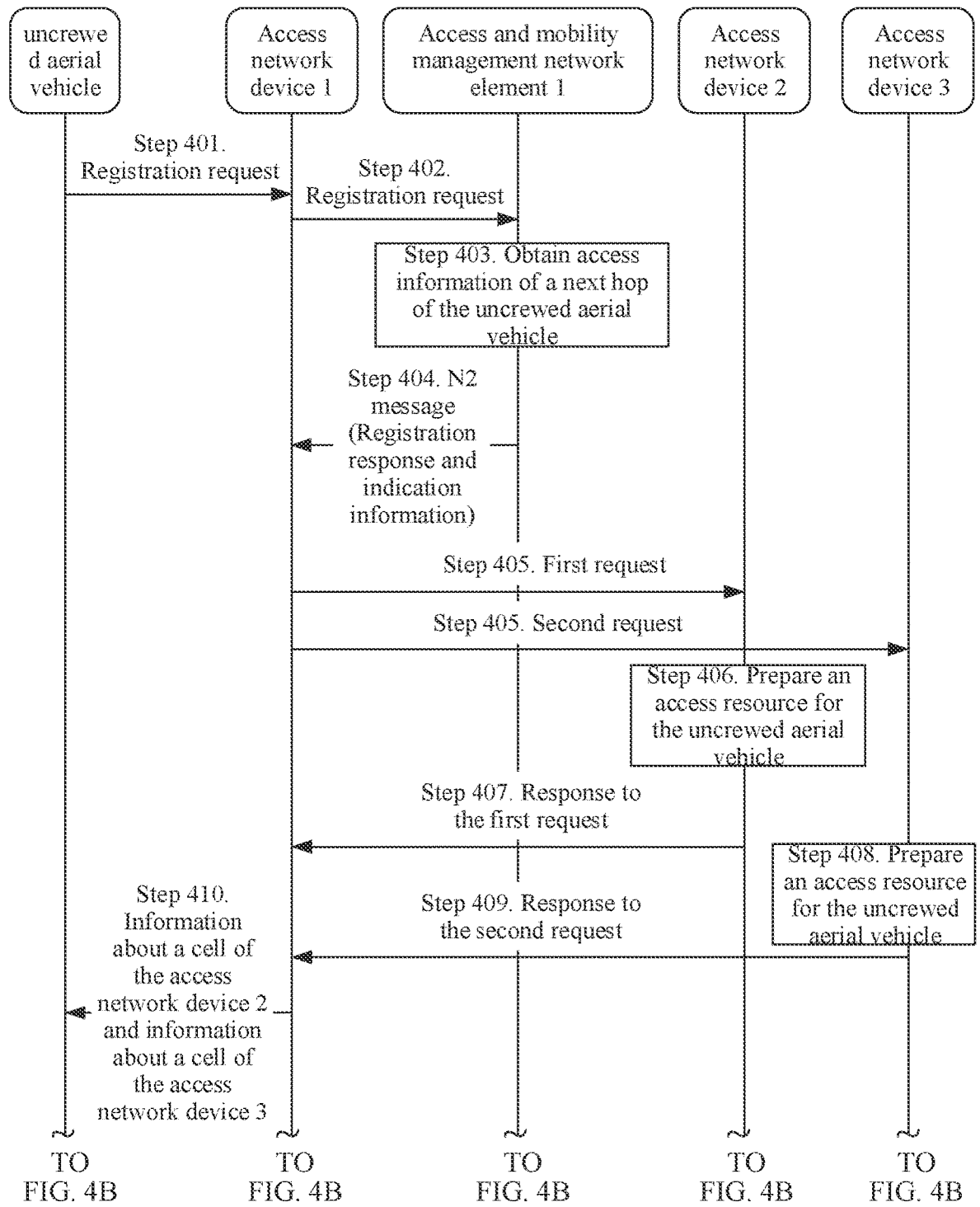
FIG. 4A and FIG. 4B are a flowchart of another uncrewed aerial vehicle communication method according to an embodiment of this application.
Figure 4B:
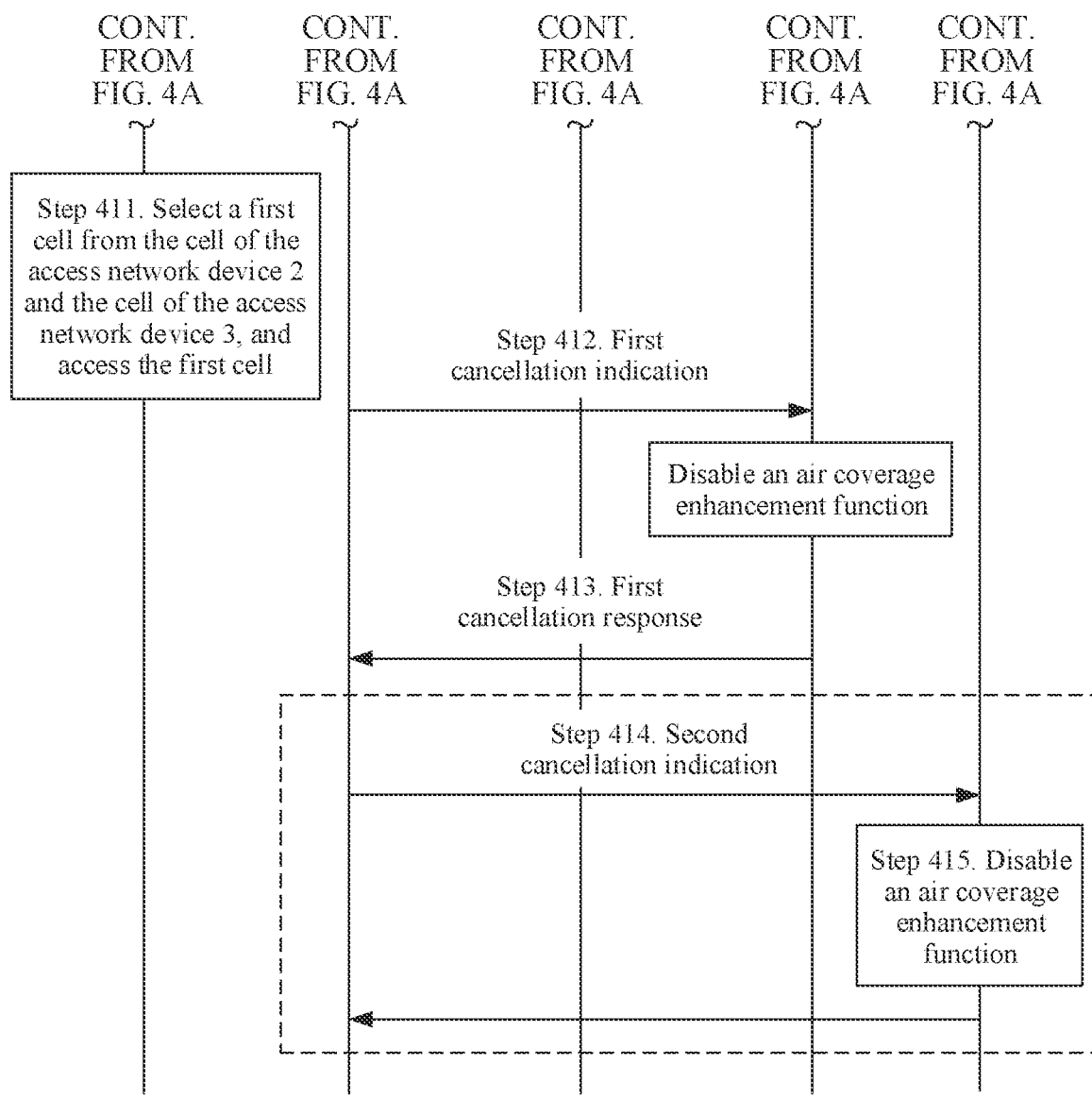

FIG. 4A and FIG. 4B show another communication method according to an embodiment of this application. As shown in FIG. 4A and FIG. 4B, the method may include the following steps.

Step 401. A The uncrewed aerial vehicle sends a registration request to an access network device 1.

Step 402. The access network device 1 sends a registration request to an access and mobility management network element 1.

Step 403. The access and mobility management network element 1 obtains access information of the next hop of the uncrewed aerial vehicle.

For step 403, refer to the descriptions in step 301. Details are not described again.

Step 404. The access and mobility management network element 1 sends an N2 message to the access network device 1.

The N2 message includes a registration response and indication information. For related descriptions of the indication information, refer to descriptions in step 302. Details are not described again.

Step 405. The access network device 1 receives the N2 message, sends a first request to the access network device 2 based on the indication information in the N2 message, and sends a second request to an access network device 3.

For related descriptions of the first request and the second request, refer to the foregoing descriptions. Details are not described again.

For a process in which the access network device 1 sends a first request to the access network device 2, refer to the process in which the first access network device sends the first request to the second access network device in the method shown in FIG. 3. Details are not described again.

For a process in which the access network device 1 sends a second request to the access network device 3, refer to the process in which the first access network device sends the second request to the third access network device in the method shown in FIG. 3. Details are not described again.

It should be noted that after receiving the N2 message, the access network device 1 may further parse out the registration response from the N2 message, and send the registration response to the uncrewed aerial vehicle, to indicate that network registration for the uncrewed aerial vehicle succeeds or fails.

Step 406. The access network device 2 receives the first request, and prepares an access resource for the uncrewed aerial vehicle.

For step 406, refer to the descriptions in step 304. Details are not described again.

Step 407. The access network device 2 sends a response to the first request to the access network device 1.

The response to the first request may include information about a cell of the access network device 2.

Step 408. The access network device 3 receives the second request, and prepares an access resource for the uncrewed aerial vehicle.

For step 408, refer to the foregoing process in which the third access network device prepares the access resource for the uncrewed aerial vehicle. Details are not described again.

Step 409. The access network device 3 sends a response to the second request to the access network device 1.

The response to the first request may include information about a cell of the access network device 2.

It should be noted that an execution sequence of step 406 to step 409 is not limited in this embodiment of this application. Step 406 and step 407 may be first performed, and then step 408 and step 409 are performed. Alternatively, step 408 and step 409 may be first performed, and then step 406 and step 407 are performed. This is not limited.

Step 410. The access network device 1 receives the response to the first request and the response to the second request, and sends the information about the cell of the access network device 2 and the information about the cell of the access network device 3 to the uncrewed aerial vehicle.

Step 411. The uncrewed aerial vehicle receives the information about the cell of the access network device 2 and the information about the cell of the access network device 3, selects a first cell from the cell of the access network device 2 and the cell of the access network device 3, and accesses the first cell.

If the first cell is the cell of the access network device 2, step 412 and step 413 are performed. If the first cell is the cell of the access network device 3, step 414 and step 415 are performed.

For a process of selecting the first cell by the uncrewed aerial vehicle, refer to the descriptions in the embodiment corresponding to FIG. 3. Details are not described again.

Step 412. The access network device 1 sends a first cancellation indication to the access network device 3.

For the first cancellation indication, refer to the foregoing descriptions. Details are not described again.

Step 413. The access network device 3 disables an air coverage enhancement function based on the first cancellation indication, and sends a first cancellation response to the access network device 1.

The first cancellation response is used to indicate the access network device 3 to disable the air coverage enhancement function.

Step 414. The access network device 1 sends a second cancellation indication to the access network device 2.

For the second cancellation indication, refer to the foregoing descriptions. Details are not described again.

Step 415. The access network device 2 disables the air coverage enhancement function based on the second cancellation indication, and sends a second cancellation response to the access network device 1.

The second cancellation response is used to indicate the access network device 2 to disable the air coverage enhancement function.

Based on the method described in FIG. 4A and FIG. 4B, the access and mobility management network element 1 may send, to the access network device 1 that currently provides a service for the uncrewed aerial vehicle, indication information used to indicate access information of the next hop of the uncrewed aerial vehicle, so that the access network device 1 sends the first request and the second request to the access network device 2 and the access network device 3 based on the access information of the next hop of the uncrewed aerial vehicle, to request the access network device 2 and the access network device 3 to prepare the access resource for the uncrewed aerial vehicle, for example, to enable the air coverage enhancement function for the uncrewed aerial vehicle. In this way, before the uncrewed aerial vehicle is handed over to the cell of the access network device 2 or the cell of the access network device 3, the cell of the access network device 2 may be notified in advance, and the access network device 3 prepares the access resource for the uncrewed aerial vehicle, so that a success rate and efficiency of cell handover of the uncrewed aerial vehicle are improved. In addition, after the uncrewed aerial vehicle is determined to access a cell of a specific access network device, a cancellation indication may be sent to an access network device other than the specific access network device in access network devices corresponding to the next hop, so that the access network device cancels the air coverage enhancement function, to avoid power consumption caused when an access network device corresponding to a cell still enables the air coverage enhancement function when no uncrewed aerial vehicle accesses the cell.

The foregoing mainly describes the solutions provided in the embodiments of this application from a perspective of interaction between network elements. It may be understood that, to implement the foregoing functions, the network elements such as the first access network device, the second access network device, the first access and mobility management network element, and the uncrewed aerial vehicle include corresponding hardware structures and/or software modules for performing the functions. A person of ordinary skill in the art should easily be aware that, in combination with the examples described in the embodiments disclosed in this specification, algorithm steps may be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the first access network device, the second access network device, the first access and mobility management network element, and the uncrewed aerial vehicle may be divided into function modules based on the foregoing method examples. For example, various function modules may be obtained through division based on corresponding functions, or two or more functions may be integrated into one processing module. The integrated module may be implemented in a form of hardware, or may be implemented in a form of a software functional module. It should be noted that, in the embodiments of this application, division into the modules is an example, and is merely logical function division. During actual implementation, another division manner may be used.

Figure 5:
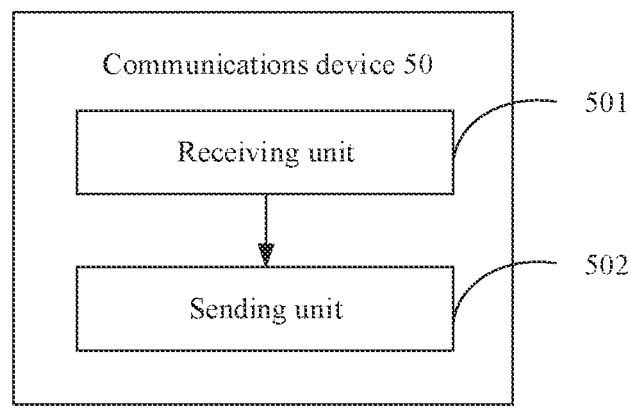
FIG. 5 is a schematic diagram of composition of a communications device 50 according to an embodiment of this application.

FIG. 5 is a schematic diagram of composition of a communications device 50 according to an embodiment of this application. The communications device 50 may be a first access network device or a chip or a system-on-a-chip in a first access network device. As shown in FIG. 5, the communications device 50 may include a receiving unit 501 and a sending unit 502.

The receiving unit 501 is configured to receive indication information from a first access and mobility management network element, where the communications device is a device that currently provides an access service for an uncrewed aerial vehicle, the indication information is used to indicate access information of a next hop of the uncrewed aerial vehicle, the access information includes information about a second access network device and/or information about a cell of a second access network device, and the second access network device is configured to provide an access service for the next hop of the uncrewed aerial vehicle. For example, the receiving unit 501 is configured to support the communications device 50 in performing step 302 and step 404.

The sending unit 502 is configured to send a first request based on the indication information, where the first request is used to request the second access network device to prepare an access resource for the uncrewed aerial vehicle.

For example, the sending unit 502 is configured to support the communications device 50 in performing step 303 and step 405.

It should be noted that all related content of the steps in the foregoing method embodiments may be cited in function descriptions of corresponding functional modules. Details are not described herein again. The communications device 50 provided in this embodiment of this application is configured to perform functions of the first access network device in the uncrewed aerial vehicle communication methods shown in FIG. 3 and FIG. 4A and FIG. 4B, and therefore can achieve a same effect as that in the foregoing uncrewed aerial vehicle communication methods.

In still another possible implementation, the communications device 50 shown in FIG. 5 may include a processing module and a communications module. The communications module may integrate functions of the receiving unit 501 and the sending unit 502. The processing module is configured to control and manage an action of the communications device 50. For example, the processing module is configured to support the communications device 50 in performing processes of a technology described in this specification. The communications module is configured to support the communications device 50 in performing step 302, step 404, step 303, step 405, and communication with another network entity. Further, the communications device 50 shown in FIG. 5 may further include a storage module, configured to store program code and data of the communications device 50.

The processing module may be a processor or a controller. The processing module may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor. The communications module may be a transceiver circuit, a communications interface, or the like. The storage module may be a memory. When the processing module is a processor, the communications module is a communications interface, and the storage module is a memory, the communications device 50 shown in FIG. 5 may be the communications device shown in FIG. 2.

Figure 6:
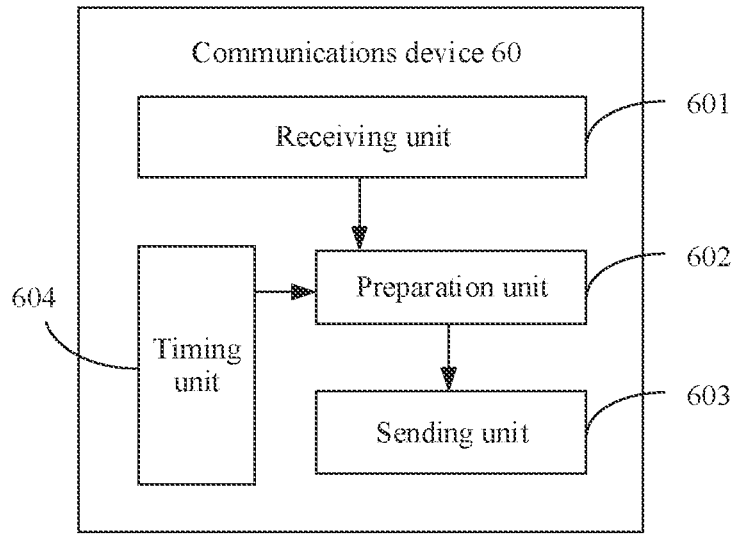
FIG. 6 is a schematic diagram of composition of a communications device 60 according to an embodiment of this application.

FIG. 6 is a schematic diagram of composition of a communications device 60 according to an embodiment of this application. The communications device 60 may be a second access network device or a chip or a system-on-a-chip in a second access network device. As shown in FIG. 6, the communications device 60 may include a receiving unit 601 and a preparation unit 602.

The receiving unit 601 is configured to receive a first request, where the first request is used to request the communications device 60 to prepare an access resource for the uncrewed aerial vehicle. For example, the receiving unit 601 is configured to support the communications device 60 in performing step 304.

The preparation unit 602 is configured to prepare the access resource for the uncrewed aerial vehicle based on the first request. For example, the preparation unit 602 is configured to support the communications device 60 in performing step 304, step 406, step 408, and the like.

Further, as shown in FIG. 6, the communications device 60 may further include:

a sending unit 603, configured to send a response to the first request, where the response to the first request is used to indicate that the uncrewed aerial vehicle is allowed to access a cell of the communications device, and the response to the first request includes information about the cell of the communications device.

Further, as shown in FIG. 6, the communications device 60 may further include:

a timing unit 604, configured to start a timer when the last uncrewed aerial vehicle that accesses the cell of the communications device leaves the cell of the communications device, where if no uncrewed aerial vehicle accesses the cell of the communications device of the second access network device before the timer expires, the communications device of the second access network device disables an air coverage enhancement function.

It should be noted that all related content of the steps in the foregoing method embodiments may be cited in function descriptions of corresponding functional modules. Details are not described herein again. The communications device 60 provided in this embodiment of this application is configured to perform functions of the second access network device in the uncrewed aerial vehicle communication methods shown in FIG. 3 and FIG. 4A and FIG. 4B, and therefore can achieve a same effect as that in the foregoing uncrewed aerial vehicle communication methods.

In still another possible implementation, the communications device 60 shown in FIG. 6 may include a processing module and a communications module. Functions of the preparation unit 602 and the timing unit 604 may be integrated into the processing module, and functions of the receiving unit 601 and the sending unit 603 may be integrated into the communications module. The processing module is configured to control and manage an action of the communications device 60. For example, the processing module is configured to support the communications device 60 in performing step 304, and another process of the technology described in this specification. The communications module is configured to support the communications device 60 in performing step 304 and communication with another network entity. Further, the communications device 60 shown in FIG. 6 may further include a storage module, configured to store program code and data of the communications device 60.

The processing module may be a processor or a controller. The processing module may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor. The communications module may be a transceiver circuit, a communications interface, or the like. The storage module may be a memory. When the processing module is a processor, the communications module is a communications interface, and the storage module is a memory, the communications device 60 shown in FIG. 6 may be the communications device shown in FIG. 2.

Figure 7:
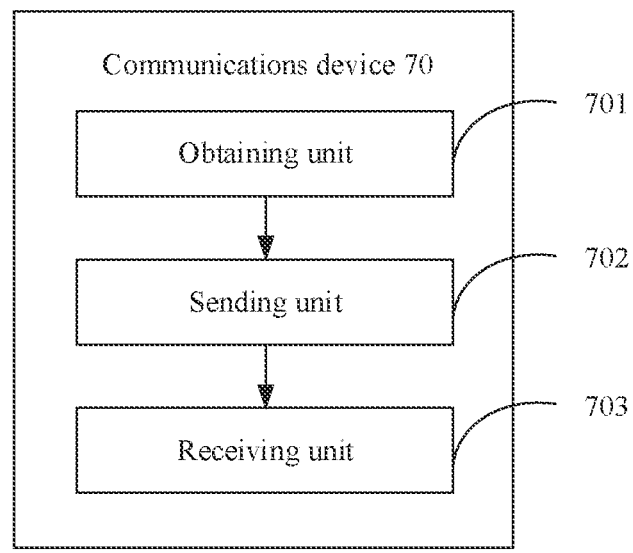
FIG. 7 is a schematic diagram of composition of a communications device 70 according to an embodiment of this application.

FIG. 7 is a schematic diagram of composition of a communications device 70 according to an embodiment of this application. The communications device 70 may be a first access and mobility management network element or a chip or a system-on-a-chip in a first access and mobility management network element. As shown in FIG. 7, the communications device 70 may include an obtaining unit 701 and a sending unit 702.

The obtaining unit 701 is configured to obtain access information of a next hop of an uncrewed aerial vehicle, where the access information includes information about a second access network device and/or information about a cell of a second access network device, and the second access network device is configured to provide an access service for the next hop of the uncrewed aerial vehicle. For example, the obtaining unit 701 is configured to support the communications device 70 in performing step 301, step 403, and the like.

The sending unit 702 is configured to send indication information to a first access network device, where the first access network device is a device that currently provides an access service for the uncrewed aerial vehicle, and the indication information is used to indicate the access information of the next hop of the uncrewed aerial vehicle. For example, the sending unit 702 is configured to support the communications device 70 in performing step 302, step 404, and the like.

Further, as shown in FIG. 7, the communications device 70 may further include:
- a receiving unit 703, configured to receive a first request from the first access network device, where the first request is used to request the second access network device to prepare an access resource for the uncrewed aerial vehicle.

The sending unit 702 is further configured to send the first request to a second access and mobility management network element, where the second access and mobility management network element is configured to provide a service for the second access network device.

It should be noted that all related content of the steps in the foregoing method embodiments may be cited in function descriptions of corresponding functional modules. Details are not described herein again. The communications device 70 provided in this embodiment of this application is configured to perform functions of the first access and mobility management network element in the uncrewed aerial vehicle communication methods shown in FIG. 3 and FIG. 4A and FIG. 4B, and therefore can achieve a same effect as that in the foregoing uncrewed aerial vehicle communication methods.

In still another possible implementation, the communications device 70 shown in FIG. 7 may include a processing module and a communications module. A function of the obtaining unit 701 may be integrated into the processing module, and functions of the sending unit 702 and the receiving unit 703 may be integrated into the communications module. The processing module is configured to control and manage an action of the communications device 70. For example, the processing module is configured to support the communications device 70 in performing step 301, step 403, and another process of the technology described in this specification. The communications module is configured to support the communications device 70 in performing step 302, step 404, and communication with another network entity. Further, the communications device 70 shown in FIG. 7 may further include a storage module, configured to store program code and data of the communications device 70.

The processing module may be a processor or a controller. The processing module may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor. The communications module may be a transceiver circuit, a communications interface, or the like. The storage module may be a memory. When the processing module is a processor, the communications module is a communications interface, and the storage module is a memory, the communications device 70 shown in FIG. 7 may be the communications device shown in FIG. 2.

Figure 8:
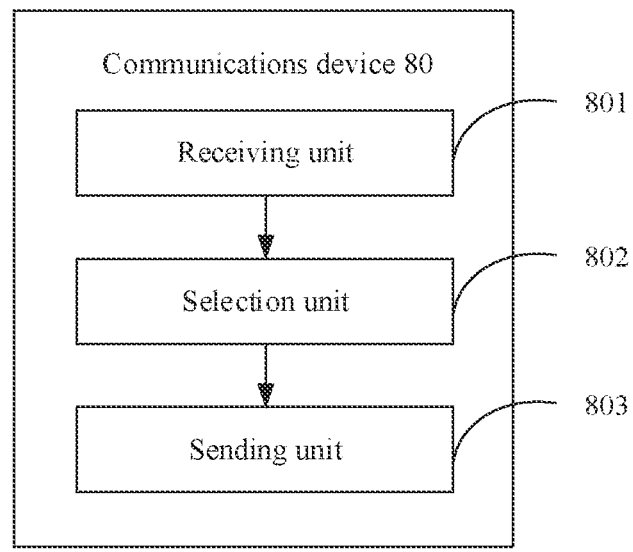
FIG. 8 is a schematic diagram of composition of a communications device 80 according to an embodiment of this application.

FIG. 8 is a schematic diagram of composition of a communications device 80 according to an embodiment of this application. The communications device 80 may be an uncrewed aerial vehicle or a chip or a system-on-a-chip in an uncrewed aerial vehicle. As shown in FIG. 8, the communications device 80 may include a receiving unit 801, a selection unit 802, and a sending unit 803.

The receiving unit 801 is configured to receive access information from a first access network device, where the access information includes information about a cell of a second access network device and information about a cell of a third access network device, and the second access network device and the third access network device are configured to provide an access service for a next hop of the uncrewed aerial vehicle. For example, the receiving unit 801 may be configured to support the communications device 80 in performing step 410.

The selection unit 802 is configured to select a first cell from the cell of the second access network device and the cell of the third access network device based on the information about the cell of the second access network device and the information about the cell of the third access network device. For example, the selection unit 802 may be configured to support the communications device 80 in performing step 411.

The sending unit 803 is configured to send a first access request to an access network device corresponding to the first cell, where the first access request is used to request to access the first cell. For example, the sending unit 803 may be configured to support the communications device 80 in performing step 411, and the like.

It should be noted that all related content of the steps in the foregoing method embodiments may be cited in function descriptions of corresponding functional modules. Details are not described herein again. The communications device 80 provided in this embodiment of this application is configured to perform functions of the uncrewed aerial vehicle in the uncrewed aerial vehicle communication methods shown in FIG. 3 and FIG. 4A and FIG. 4B, and therefore can achieve a same effect as that in the foregoing uncrewed aerial vehicle communication methods.

In still another possible implementation, the communications device 80 shown in FIG. 8 may include a processing module and a communications module. A function of the selection unit 802 may be integrated into the processing module, and functions of the receiving unit 801 and the sending unit 803 may be integrated into the communications module. The processing module is configured to control and manage an action of the communications device 80. For example, the processing module is configured to support the communications device 80 in performing step 411, and another process of the technology described in this specification. The communications module is configured to support the communications device 80 in performing step 410 and communication with another network entity. Further, the communications device 80 shown in FIG. 8 may further include a storage module, configured to store program code and data of the communications device 80.

The processing module may be a processor or a controller. The processing module may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor. The communications module may be a transceiver circuit, a communications interface, or the like. The storage module may be a memory. When the processing module is a processor, the communications module is a communications interface, and the storage module is a memory, the communications device 80 shown in FIG. 8 may be the communications device shown in FIG. 2.

The foregoing descriptions about implementations allow a person skilled in the art to understand that, for the purpose of convenient and brief description, division into the foregoing function modules is taken as an example for illustration. In actual application, the foregoing functions can be allocated to different modules and implemented based on a requirement, that is, an inner structure of an apparatus is divided into different function modules to implement all or some of the functions described above.

In the several embodiments provided in this application, it should be understood that the disclosed apparatus and method may be implemented in other manners. For example, the described apparatus embodiments are merely examples. For example, the module or unit division is merely logical function division and there may be another division during actual implementation. For example, a plurality of units or components may be combined or integrated into another apparatus, or some features may be ignored or not performed. In addition, the displayed or discussed mutual couplings or direct couplings or communications connections may be implemented through some interfaces. The indirect couplings or communications connections between the apparatuses or units may be implemented in electronic, mechanical, or other forms.

The units described as separate parts may or may not be physically separate, and parts displayed as units may be one or more physical units, that is, may be located in one place, or may be distributed on a plurality of different places. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of a software functional unit and sold or used as an independent product, the integrated unit may be stored in a readable storage medium. Based on such an understanding, the technical solutions in the embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor to perform all or some of the steps of the methods described in the embodiments of this application. The foregoing storage medium includes: any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application, Therefore, the protection scope of this application shall be subject to the protection scope of the claims.

What is claimed is:

1. An uncrewed aerial vehicle communication method, wherein the uncrewed aerial vehicle communication method comprises:
   receiving, by a first access network device, indication information from a first access and mobility management network element, wherein the first access network device is a device that currently provides an access service for an uncrewed aerial vehicle, the indication information is used to indicate access information of a next hop of the uncrewed aerial vehicle, the access information comprises at least one of information about a second access network device or information about a cell of a second access network device, and the second access network device is configured to provide an access service for the next hop of the uncrewed aerial vehicle, and wherein the first access network device and the second access network device are associated respectively with different cells; and
   sending, by the first access network device, a first request based on the indication information, wherein the first request is used to request the second access network device to prepare an access resource for the uncrewed aerial vehicle;
   receiving, by the first access network device, a first response from the second access network device, wherein the first response indicates that the uncrewed aerial vehicle is allowed to access the cell of the second access network device;
   sending, by the first access network device, a second request to a third access network device, wherein the second request is used to request the third access network device to prepare the access resource for the uncrewed aerial vehicle; and
   receiving, by the first access network device, a second response from the third access network device, wherein the second response indicates that the uncrewed aerial vehicle is allowed to access a cell of the third access network device.

2. The uncrewed aerial vehicle communication method according to claim 1, wherein:
   the first response to the first request comprises the information about the cell of the second access network device; and
   the uncrewed aerial vehicle communication method comprises:
      sending, by the first access network device, the information about the cell of the second access network device to the uncrewed aerial vehicle.

3. The uncrewed aerial vehicle communication method according to claim 1, wherein:
   the second response to the second request comprises information about the cell of the third access network device; and
   the uncrewed aerial vehicle communication method comprises:
      sending, by the first access network device, the information about the cell of the third access network device to the uncrewed aerial vehicle.

4. The uncrewed aerial vehicle communication method according to claim 3, wherein the uncrewed aerial vehicle communication method further comprises:
   in response to determining that the uncrewed aerial vehicle accesses the cell of the second access network device, sending, by the first access network device, a first cancellation indication to the third access network device, wherein the first cancellation indication is used to indicate cancellation of access of the uncrewed aerial vehicle to the cell of the third access network device; or in response to determining that the uncrewed aerial vehicle accesses the cell of the third access network device, sending, by the first access network device, a second cancellation indication to the second access network device, wherein the second cancellation indication is used to indicate cancellation of access of the uncrewed aerial vehicle to the cell of the second access network device.

5. The uncrewed aerial vehicle communication method according to claim 1, wherein the sending, by the first access network device, a first request comprises:

sending, by the first access network device, the first request to the second access network device by using a communications link between the first access network device and the second access network device; or when no communications link is established between the first access network device and the second access network device, sending, by the first access network device, the first request to the first access and mobility management network element.

6. An uncrewed aerial vehicle communication method, wherein the uncrewed aerial vehicle communication method comprises:

receiving, by an uncrewed aerial vehicle, access information from a first access network device, wherein the access information comprises information about a cell of a second access network device and information about a cell of a third access network device, and the second access network device and the third access network device are configured to provide an access service for a next hop of the uncrewed aerial vehicle, and wherein the first access network device and the second access network device are associated respectively with different cells;

selecting, by the uncrewed aerial vehicle, a first cell from the cell of the second access network device and the cell of the third access network device based on the information about the cell of the second access network device and the information about the cell of the third access network device;

sending, by the uncrewed aerial vehicle, a first access request to an access network device corresponding to the first cell, wherein the first access request is used to request to access the first cell;

in response to determining that the uncrewed aerial vehicle fails to access the first cell, selecting a second cell from the cell of the second access network device and the cell of the third access network device; and sending a second access request to an access network device corresponding to the second cell, wherein the second access request is used to request to access the second cell.

7. The uncrewed aerial vehicle communication method according to claim 6, wherein the selecting, by the uncrewed aerial vehicle, a first cell from the cell of the second access network device and the cell of the third access network device comprises:

obtaining, by the uncrewed aerial vehicle, signal quality values of the cell of the second access network device and the cell of the third access network device; and determining a cell having a larger signal quality value in the cell of the second access network device and the cell of the third access network device as the first cell.

8. The uncrewed aerial vehicle communication method according to claim 7, wherein the selecting a second cell from the cell of the second access network device and the cell of the third access network device comprises:

selecting a second cell with a smaller signal quality value.

9. The uncrewed aerial vehicle communication method according to claim 6, wherein the access information further comprises a priority of the cell of the second access network device and a priority of the cell of the third access network device, and the selecting, by the uncrewed aerial vehicle, a first cell from the cell of the second access network device and the cell of the third access network device comprises:

determining, by the uncrewed aerial vehicle, a cell with a higher priority in the cell of the second access network device and the cell of the third access network device as the first cell.

10. The uncrewed aerial vehicle communication method according to claim 9, wherein the selecting a second cell from the cell of the second access network device and the cell of the third access network device comprises:

selecting a second cell with a lower priority.

11. A communications device, wherein the communications device comprises:

at least one processor; and one or more memories coupled to the at least one processor and storing programming instructions for execution by the at least one processor to:

receive indication information from a first access and mobility management network element, wherein the communications device is a device that currently provides an access service for an uncrewed aerial vehicle, the indication information is used to indicate access information of a next hop of the uncrewed aerial vehicle, the access information comprises at least one of information about a second access network device or information about a cell of a second access network device, and the second access network device is configured to provide an access service for the next hop of the uncrewed aerial vehicle, and wherein the communications device and the second access network device are associated respectively with different cells; and send a first request based on the indication information, wherein the first request is used to request the second access network device to prepare an access resource for the uncrewed aerial vehicle;

receive a first response from the second access network device, wherein the first response indicates that the uncrewed aerial vehicle is allowed to access the cell of the second access network device;

send a second request to a third access network device, wherein the second request is used to request the third access network device to prepare the access resource for the uncrewed aerial vehicle; and receive a second response from the third access network device, wherein the second response indicates that the uncrewed aerial vehicle is allowed to access a cell of the third access network device.

12. The communications device according to claim 11, wherein:

the first response to the first request comprises the information about the cell of the second access network device; and the one or more memories store the programming instructions for execution by the at least one processor further to:

send the information about the cell of the second access network device to the uncrewed aerial vehicle.

13. The communications device according to claim 11, wherein:
the second response to the second request comprises information about the cell of the third access network device; and
the one or more memories store the programming instructions for execution by the at least one processor further to:
send the information about the cell of the third access network device to the uncrewed aerial vehicle.

14. The communications device according to claim 13, wherein the one or more memories store the programming instructions for execution by the at least one processor further to:
in response to determining that the uncrewed aerial vehicle accesses the cell of the second access network device, send a first cancellation indication to the third access network device, wherein the first cancellation indication is used to indicate cancellation of access of the uncrewed aerial vehicle to the cell of the third access network device; or
in response to determining that the uncrewed aerial vehicle accesses the cell of the third access network device, send a second cancellation indication to the second access network device, wherein the second cancellation indication is used to indicate cancellation of access of the uncrewed aerial vehicle to the cell of the second access network device.

15. The communications device according to claim 11, wherein the one or more memories store the programming instructions for execution by the at least one processor further to:
send the first request to the second access network device by using a communications link between the communications device and the second access network device; or
when no communications link is established between the communications device and the second access network device, send the first request to the first access and mobility management network element.

16. An uncrewed aerial vehicle, wherein the uncrewed aerial vehicle comprises:
at least one processor; and
one or more memories coupled to the at least one processor and storing programming instructions for execution by the at least one processor to:
receive access information from a first access network device, wherein the access information comprises information about a cell of a second access network device and information about a cell of a third access network device, and the second access network device and the third access network device are configured to provide an access service for a next hop of the uncrewed aerial vehicle, and wherein the first access network device and the second access network device are associated respectively with different cells;
select a first cell from the cell of the second access network device and the cell of the third access network device based on the information about the cell of the second access network device and the information about the cell of the third access network device;
send a first access request to an access network device corresponding to the first cell, wherein the first access request is used to request to access the first cell;
in response to determining that the uncrewed aerial vehicle fails to access the first cell, select a second cell from the cell of the second access network device and the cell of the third access network device; and
send a second access request to an access network device corresponding to the second cell, wherein the second access request is used to request to access the second cell.

17. The uncrewed aerial vehicle according to claim 16, wherein the one or more memories store the programming instructions for execution by the at least one processor further to:
obtain signal quality values of the cell of the second access network device and the cell of the third access network device; and
determine a cell having a larger signal quality value in the cell of the second access network device and the cell of the third access network device as the first cell.

18. The uncrewed aerial vehicle according to claim 17, wherein the select the second cell from the cell of the second access network device and the cell of the third access network device comprises:
select a second cell with a smaller signal quality value.

19. The uncrewed aerial vehicle according to claim 16, wherein the access information further comprises a priority of the cell of the second access network device and a priority of the cell of the third access network device, and the one or more memories store the programming instructions for execution by the at least one processor further to:
determine a cell with a higher priority in the cell of the second access network device and the cell of the third access network device as the first cell.

20. The uncrewed aerial vehicle according to claim 19, wherein the select a second cell from the cell of the second access network device and the cell of the third access network device comprises:
select a second cell with a lower priority.

* * * * *